(12) United States Patent
Mereddy

(10) Patent No.: US 12,052,280 B2
(45) Date of Patent: Jul. 30, 2024

(54) APPARATUS FOR DISTRIBUTED DENIAL OF SERVICE (DDOS) DETECTION AND MITIGATION

(71) Applicant: Charter Communications Operating, LLC, St. Louis, MO (US)

(72) Inventor: Sandeep Reddy Mereddy, Aurora, CO (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 0 days.

(21) Appl. No.: 17/737,942

(22) Filed: May 5, 2022

(65) Prior Publication Data
US 2023/0362191 A1 Nov. 9, 2023

(51) Int. Cl.
| | | |
|---|---|---|
| G06F 13/00 | (2006.01) | |
| H04L 9/40 | (2022.01) | |
| H04L 47/70 | (2022.01) | |

(52) U.S. Cl.
CPC ........ *H04L 63/1458* (2013.01); *H04L 47/823* (2013.01); *H04L 63/1416* (2013.01); *H04L 2463/141* (2013.01)

(58) Field of Classification Search
CPC .............. H04L 63/1458; H04L 47/823; H04L 63/1416; H04L 2463/141
USPC ...... 709/200, 224, 223, 232; 726/26, 21–25, 726/3–7
See application file for complete search history.

(56) References Cited

U.S. PATENT DOCUMENTS

| | | | |
|---|---|---|---|
| 7,792,963 | B2 | 9/2010 | Gould |
| 2003/0056217 | A1 | 3/2003 | Brooks |
| 2006/0130107 | A1 | 6/2006 | Gonder et al. |
| 2007/0217436 | A1 | 9/2007 | Markley |
| 2009/0248794 | A1 | 10/2009 | Helms |
| 2010/0313236 | A1 | 12/2010 | Straub |

(Continued)

OTHER PUBLICATIONS

BWManager: Mitigating Denial of Service Attacks in Software-Defined networks Through Bandwidth Prediction; Tao Wang et al.; IEEE Transactions on Network and Service Management (Year: 2018).*

(Continued)

*Primary Examiner* — Kenneth R Coulter
(74) *Attorney, Agent, or Firm* — Otterstedt & Kammer PLLC

(57) ABSTRACT

Obtain, by a controller, from at least one provisioning database of an internet service provider, assigned bandwidth per customer for a plurality of internet service provider customers. Obtain, by the controller, from a plurality of peering entry points of the internet service provider, currently used bandwidth per customer for the plurality of internet service provider customers. Compare, by the controller, for the plurality of internet service provider customers, the assigned bandwidth per customer to the currently used bandwidth per customer, to determine at least one given customer of the plurality of internet service provider customers putatively suffering from a distributed denial of service attack. Initiate at least one remedial action for the at least one given customer of the plurality of internet service provider customers putatively suffering from the distributed denial of service attack.

31 Claims, 14 Drawing Sheets

(56) References Cited

U.S. PATENT DOCUMENTS

2015/0180791 A1* 6/2015 Bentley .............. H04L 47/2458
370/235

OTHER PUBLICATIONS

FlowFence: A Denial of Service Defense System for Software Defined Networking; 2015 Global Information Infrastructure and Networking Symposium (GIIS); Andres Piedrahita et al. (Year: 2015).*

Linda Musthaler; "Best Practices to Mitigate DDoS Attacks"; Network World; IDG Communications, Inc.;pp. 1-4; Jan. 2013.*

"Defeating DDoS Attacks," White Paper, Cisco Systems, Inc., 2004, pp. 1-11.

Cisco IOS Flexible NetFlow Technology Data Sheet Last Updated: Dec. 2008 Cisco Systems 5 pages.

Cisco IOS Netflow Data Sheet 2004 Cisco Systems, Inc. 4 pages.

* cited by examiner

APPARATUS FOR DISTRIBUTED DENIAL OF SERVICE (DDOS) DETECTION AND MITIGATION

FIELD OF THE INVENTION

The present invention relates generally to the electrical, electronic and computer arts, and, more particularly, to protecting broadband networks and/or video content networks from cyberattacks, and the like.

BACKGROUND OF THE INVENTION

In a denial-of-service attack (DoS attack), a bad actor tries to make a computing resource unavailable to legitimate users by disrupting services of a host. Typically, the bad actor floods the computing resource with nonsense requests to overload the resource and prevent some or all legitimate requests from being fulfilled.

In a distributed denial-of-service attack (DDoS attack), the incoming malevolent traffic comes from many different sources, making mitigation more complicated. Simply blocking a single source will not work.

SUMMARY OF THE INVENTION

Principles of the invention provide techniques for distributed denial of service (DDOS) detection and mitigation using, for example, artificial intelligence/machine learning (AI/ML). In one aspect, an exemplary method includes obtaining, by a controller, from at least one provisioning database of an internet service provider, assigned bandwidth per customer for a plurality of internet service provider customers; obtaining, by the controller, from a plurality of peering entry points of the internet service provider, currently used bandwidth per customer for the plurality of internet service provider customers; comparing, by the controller, for the plurality of internet service provider customers, the assigned bandwidth per customer to the currently used bandwidth per customer, to determine at least one given customer of the plurality of internet service provider customers putatively suffering from a distributed denial of service attack; and the controller initiating at least one remedial action for the at least one given customer of the plurality of internet service provider customers putatively suffering from the distributed denial of service attack.

In another aspect, an exemplary system includes a memory; and at least one processor, coupled to the memory, and operative to: obtain, from at least one provisioning database of an internet service provider, assigned bandwidth per customer for a plurality of internet service provider customers; obtain, from a plurality of peering entry points of the internet service provider, currently used bandwidth per customer for the plurality of internet service provider customers; compare, for the plurality of internet service provider customers, the assigned bandwidth per customer to the currently used bandwidth per customer, to determine at least one given customer of the plurality of internet service provider customers putatively suffering from a distributed denial of service attack; and initiate at least one remedial action for the at least one given customer of the plurality of internet service provider customers putatively suffering from the distributed denial of service attack.

In yet another aspect, a non-transitory computer readable medium includes processor executable instructions which when executed by a processor cause the processor to perform the method of: obtaining, from at least one provisioning database of an internet service provider, assigned bandwidth per customer for a plurality of internet service provider customers; obtaining, from a plurality of peering entry points of the internet service provider, currently used bandwidth per customer for the plurality of internet service provider customers; comparing, for the plurality of internet service provider customers, the assigned bandwidth per customer to the currently used bandwidth per customer, to determine at least one given customer of the plurality of internet service provider customers putatively suffering from a distributed denial of service attack; and initiating at least one remedial action for the at least one given customer of the plurality of internet service provider customers putatively suffering from the distributed denial of service attack.

In a further aspect, an exemplary system includes a customer profile collector configured to obtain, from at least one provisioning database of an internet service provider, assigned bandwidth per customer for a plurality of internet service provider customers; an IP flows collector configured to obtain, from a plurality of peering entry points of the internet service provider, currently used bandwidth per customer for the plurality of internet service provider customers; a core logic module, coupled to the customer profile collector and the IP flows collector, and configured to compare, for the plurality of internet service provider customers, the assigned bandwidth per customer to the currently used bandwidth per customer, to determine at least one given customer of the plurality of internet service provider customers putatively suffering from a distributed denial of service attack; and a configuration push module, coupled to the core logic module, and configured to initiate at least one remedial action for the at least one given customer of the plurality of internet service provider customers putatively suffering from the distributed denial of service attack.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., a controller) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein. Some or all of the compute functions described herein can also be virtualized and located in the cloud.

Aspects of the present invention can provide substantial beneficial technical effects. For example, one or more embodiments of the invention achieve one or more of:

rapid detection and remediation of cyberattacks, such as distributed denial of service (DDOS) attacks;

use of artificial intelligence/machine learning to project usage, and associated core logic, helps to avoid the initiation of remediation actions in the case when a current high usage of bandwidth is legitimate; and improvement in the technological process of operating and maintaining a cable/fiber broadband communications network (broadband cable/fiber is used herein to refer to a primarily wired network using coaxial cable and/or fiber optic cable, such as shown in FIGS. 1-9).

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Figure 1:
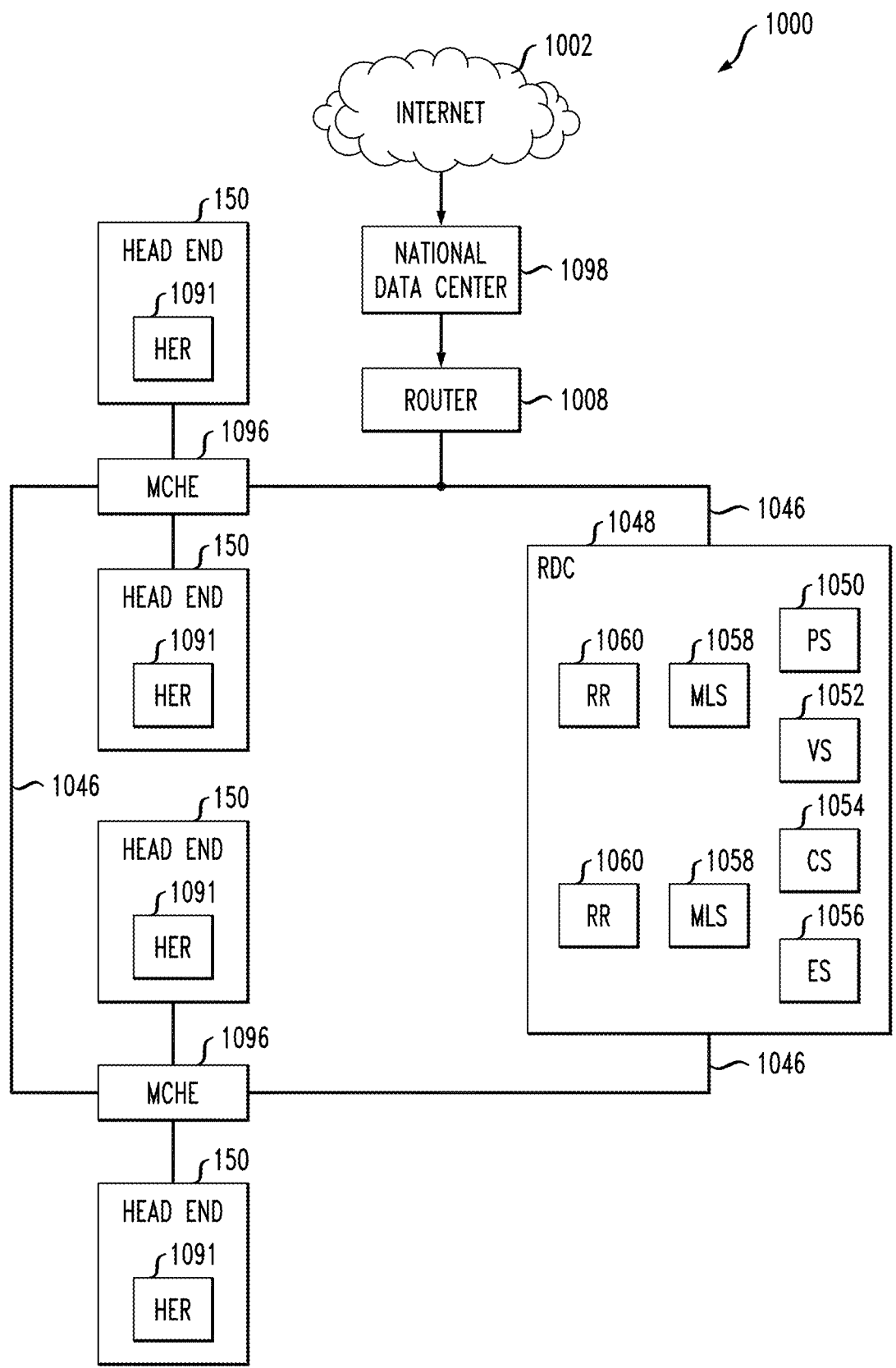
FIG. 1 is a block diagram of an exemplary embodiment of a system, within which one or more aspects of the invention can be implemented.

Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area(s). In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, California, USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
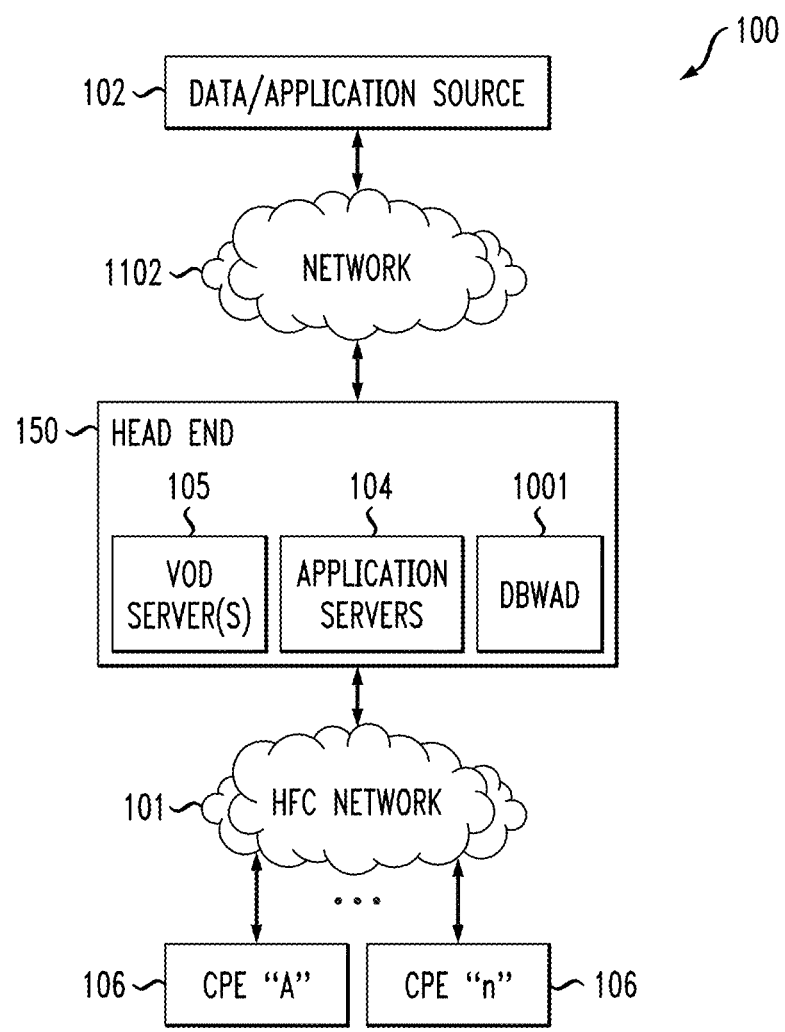
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ Service ONUs (S-ONUs; ONU=optical network unit) as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components.

Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g., FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
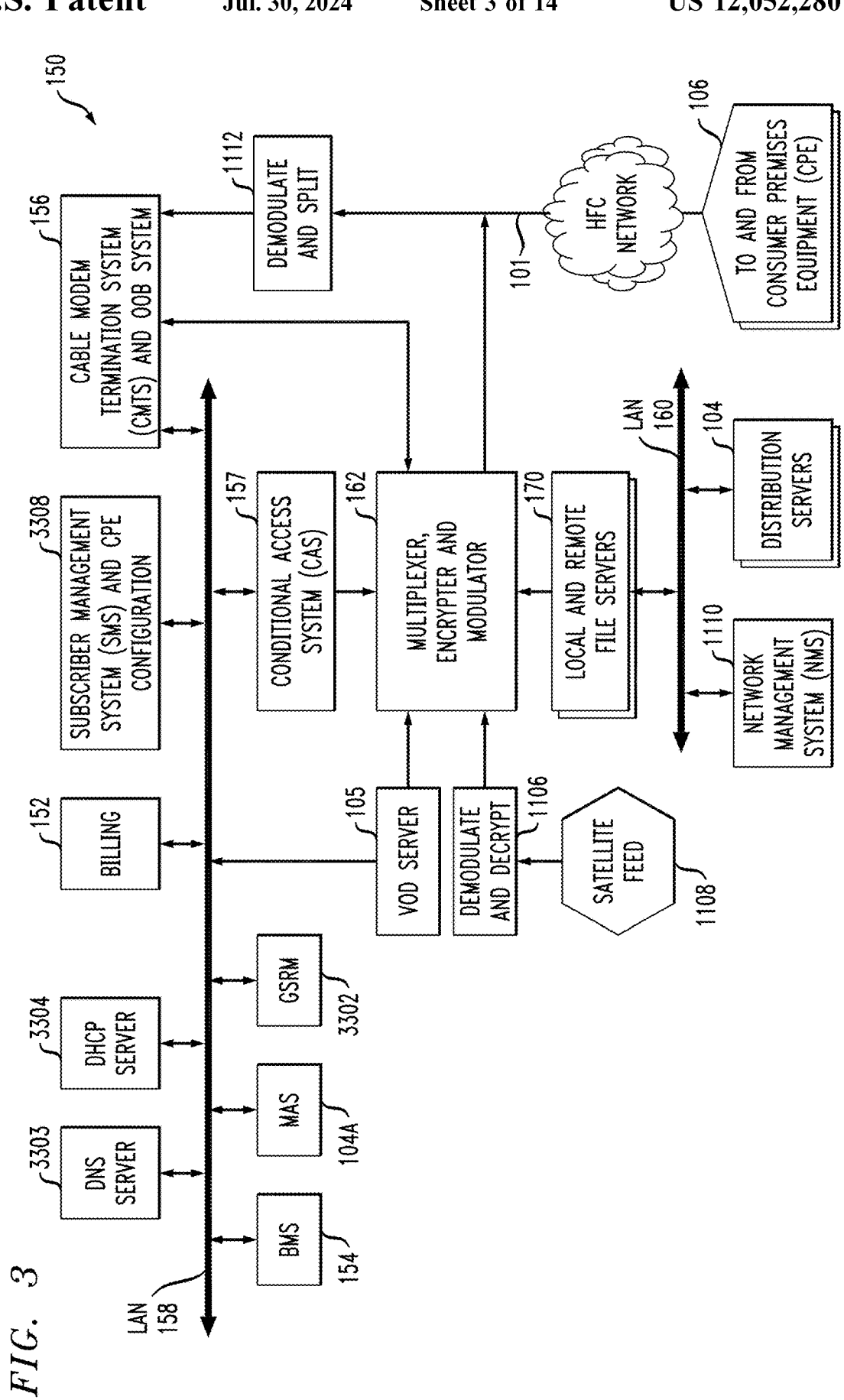
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville CO 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. HFC systems using DOCSIS to transmit data are one non-limiting exemplary application context for one or more embodiments. However, one or more embodiments are applicable to a variety of different kinds of networks.

It is also worth noting that the use of DOCSIS Provisioning of EPON (Ethernet over Passive Optical Network) or "DPoE" (Specifications available from CableLabs, Louisville, CO, USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

It should be noted that the exemplary architecture in FIG. 3 shows a traditional location for the CMTS 156 in a head end. As will be appreciated by the skilled artisan, CMTS functionality can be moved down closer to the customers or up to a national or regional data center or can be dispersed into one or more locations.

Figure 4:
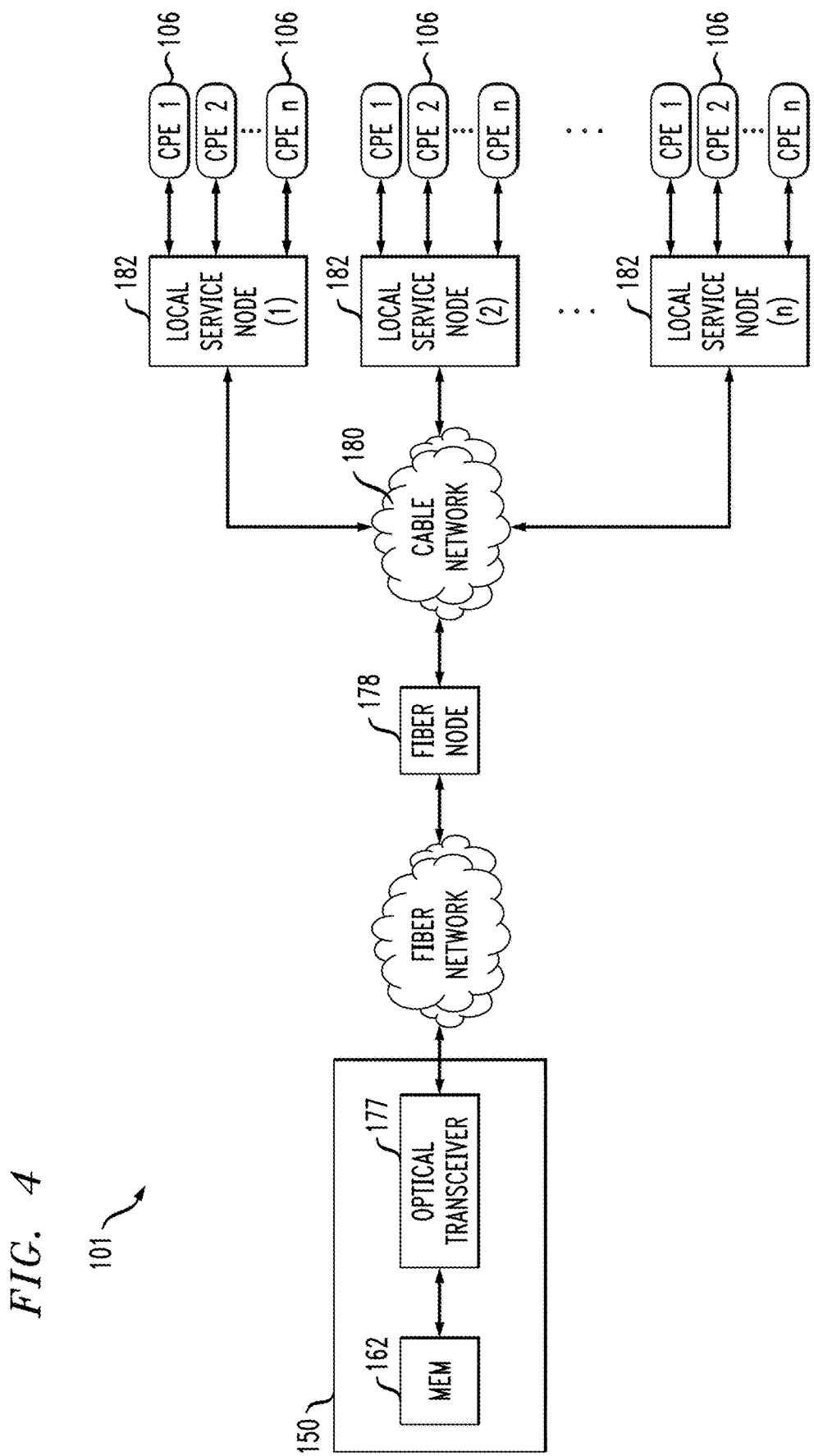
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network 179 to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed. It should be understood that embodiments of the invention have broad applicability to a variety of different types of networks. Some embodiments relate to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
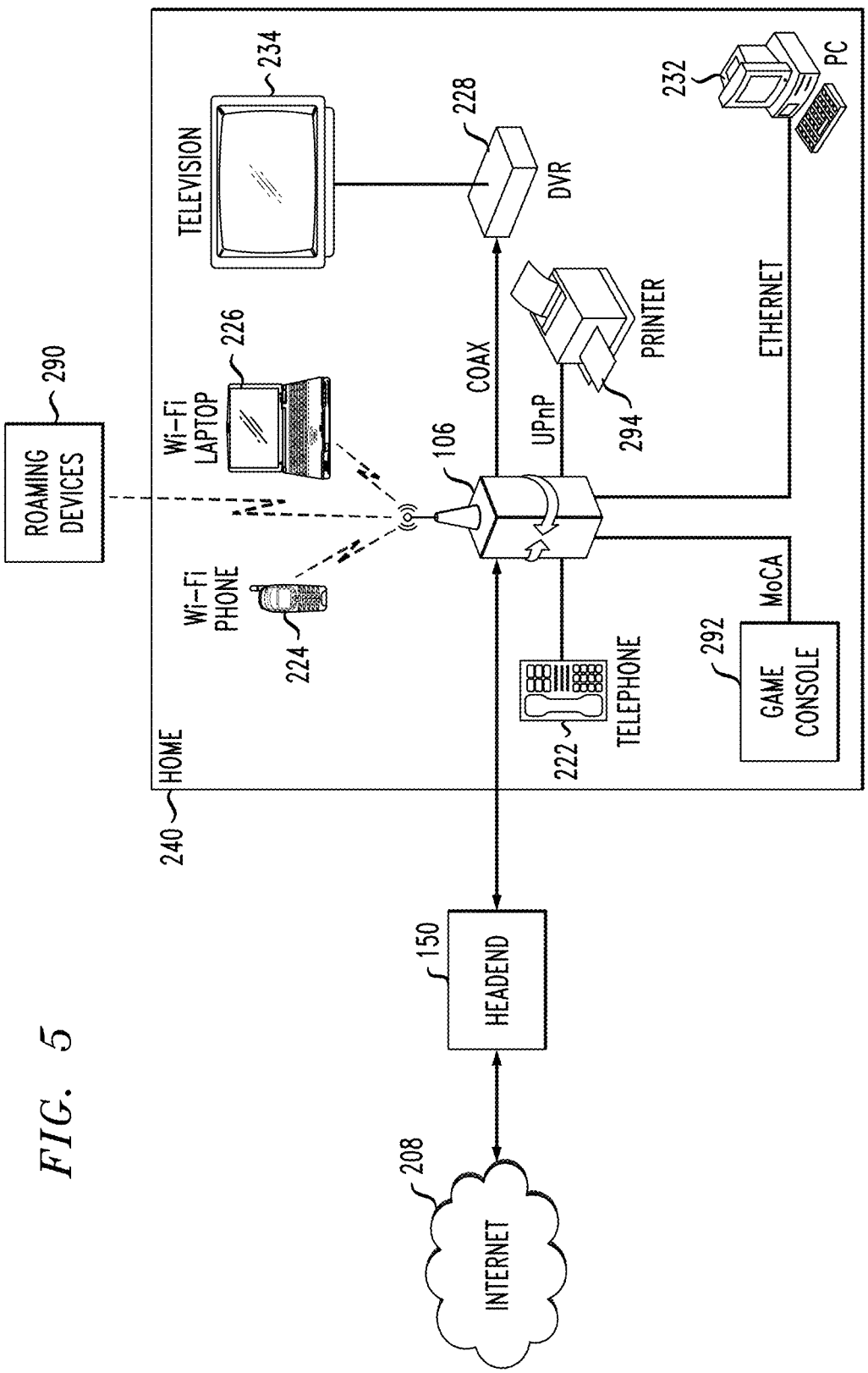
FIG. 5 is a functional block diagram of a premises network, including an exemplary centralized customer premises equipment (CPE) unit, interfacing with a head end such as that of FIG. 3.
Figure 6:
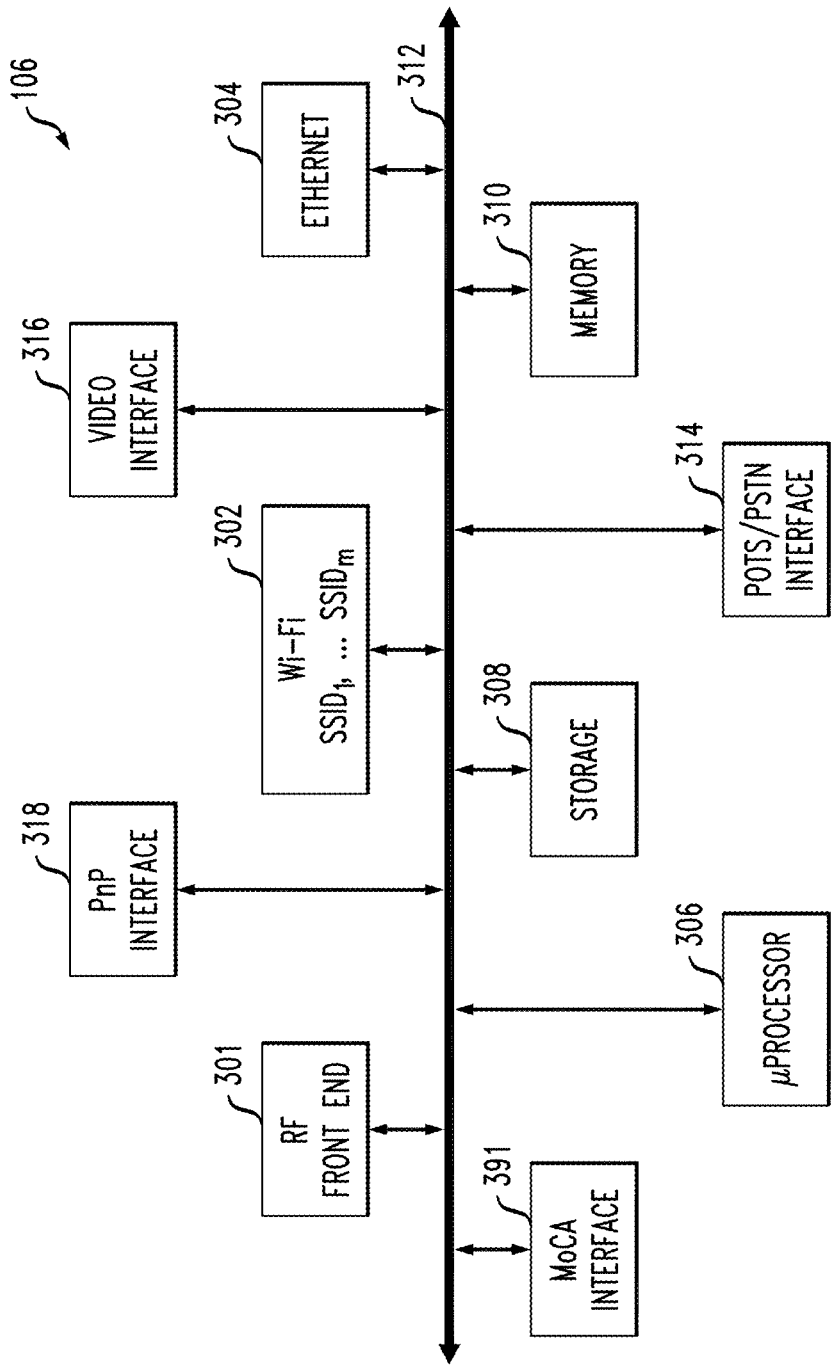
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example, over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random-access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g., the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g., Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances, the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
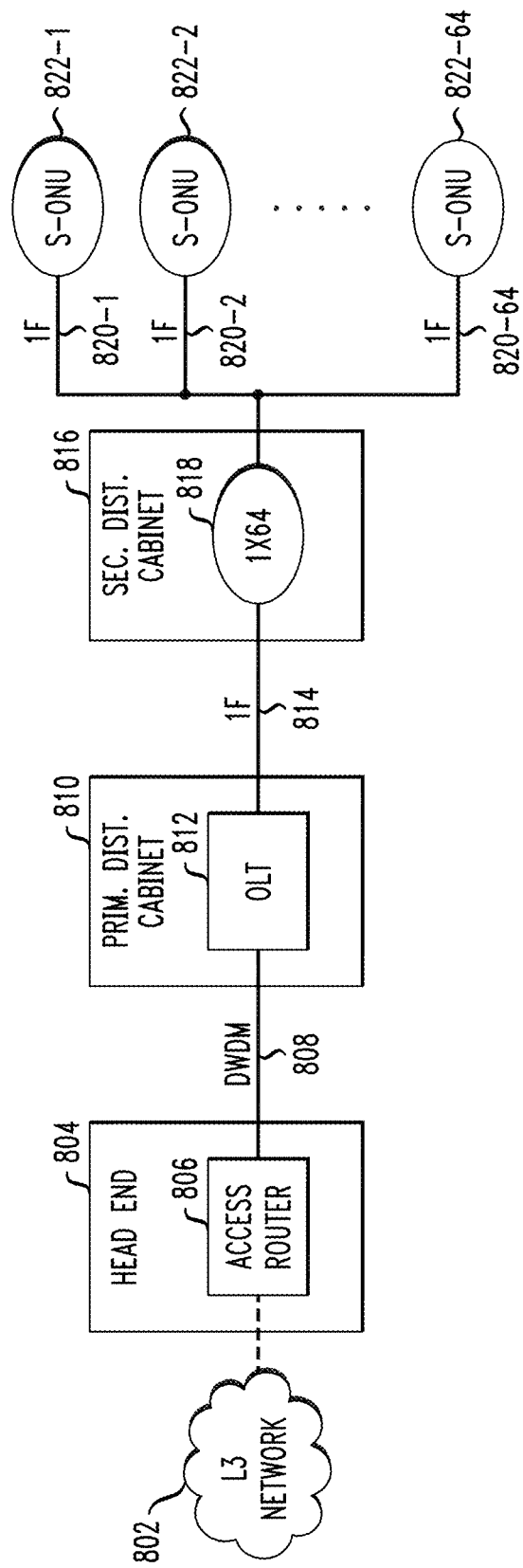
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 1802 generally represents the elements in FIG. 1 upstream of the head ends 150, while head end 1804, including access router 1806, is an alternative form of head end that can be used in lieu of or in addition to head ends 150 in one or more embodiments. Head end 1804 is suitable for FTTH implementations. Access router 1806 of head end 1804 is coupled to optical line terminal 1812 in primary distribution cabinet 1810 via dense wavelength division multiplexing (DWDM) network 1808. Single fiber coupling 1814 is then provided to a 1:64 splitter 1818 in secondary distribution cabinet 1816 which provides a 64:1 expansion to sixty-four S-ONUs 1822-1 through 1822-64 (in multiple premises) via sixty-four single fibers 1820-1 through 1820-64, it being understood that a different ratio splitter could be used in other embodiments and/or that not all of the 64 (or other number of) outlet ports are necessarily connected to an S-ONU.

Figure 9:
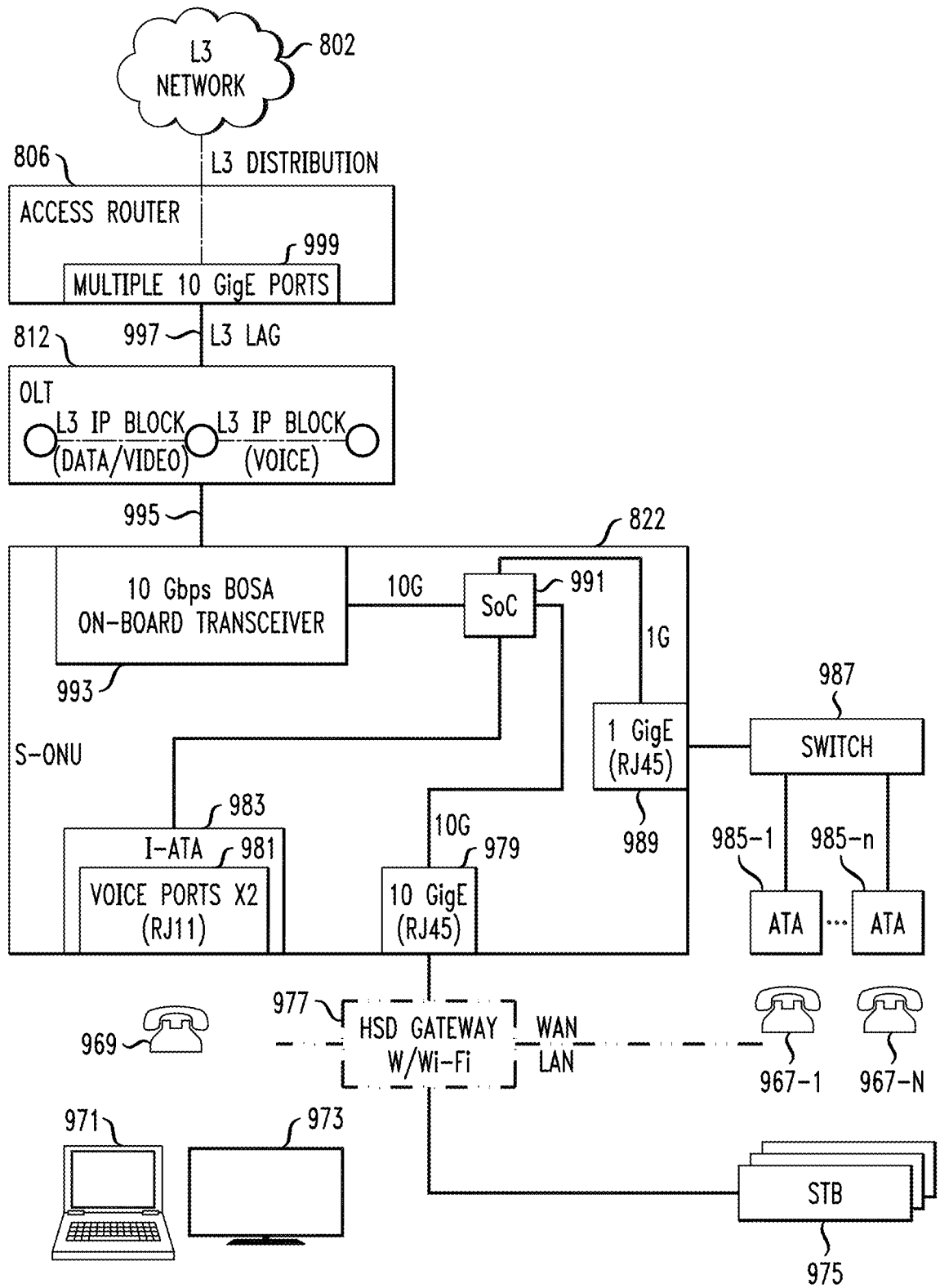
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 1806 is provided with multiple ten-Gigabit Ethernet ports 1999 and is coupled to OLT 1812 via L3 (layer 3) link aggregation group (LAG) 1997. OLT 1812 can include an L3 IP block for data and video, and another L3 IP block for voice, for example. In a non-limiting example, S-ONU 1822 includes a 10 Gbps bi-directional optical subassembly (BOSA) on-board transceiver 1993 with a 10G connection to system-on-chip (SoC) 1991. SoC 1991 is coupled to a 10 Gigabit Ethernet RJ45 port 1979, to which a high-speed data gateway 1977 with Wi-Fi capability is connected via category 5E cable. Gateway 1977 is coupled to one or more set-top boxes 1975 via category 5e, and effectively serves as a wide area network (WAN) to local area network (LAN) gateway. Wireless and/or wired connections can be provided to devices such as laptops 1971, televisions 1973, and the like, in a known manner. Appropriate telephonic capability can be provided. In a non-limiting example, residential customers are provided with an internal integrated voice gateway (I-ATA or internal analog telephone adapter) 1983 coupled to SoC 1991, with two RJ11 voice ports 1981 to which up to two analog telephones 1969 can be connected. Furthermore, in a non-limiting example, business customers are further provided with a 1 Gigabit Ethernet RJ45 port 1989 coupled to SoC 1991, to which switch 1987 is coupled via Category 5e cable. Switch 1987 provides connectivity for a desired number n (typically more than two) of analog telephones 1967-1 through 1967-n, suitable for the needs of the business, via external analog telephone adapters (ATAs) 1985-1 through 1985-n. The parameter "n" in FIG. 9 is not necessarily the same as the parameter "n" in other figures, but rather generally represents a desired number of units. Connection 1995 can be, for example, via SMF (single-mode optical fiber).

In addition to "broadcast" content (e.g., video programming), the systems of FIGS. 1-6, 8, and 9 can, if desired, also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Principles of the present disclosure will be described herein, at least in part, in the context of a controller 1295; indeed, of apparatus, systems, and methods for distributed denial of service (DDOS) detection and prevention using artificial intelligence/machine learning (AI/ML). It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

Figure 10:
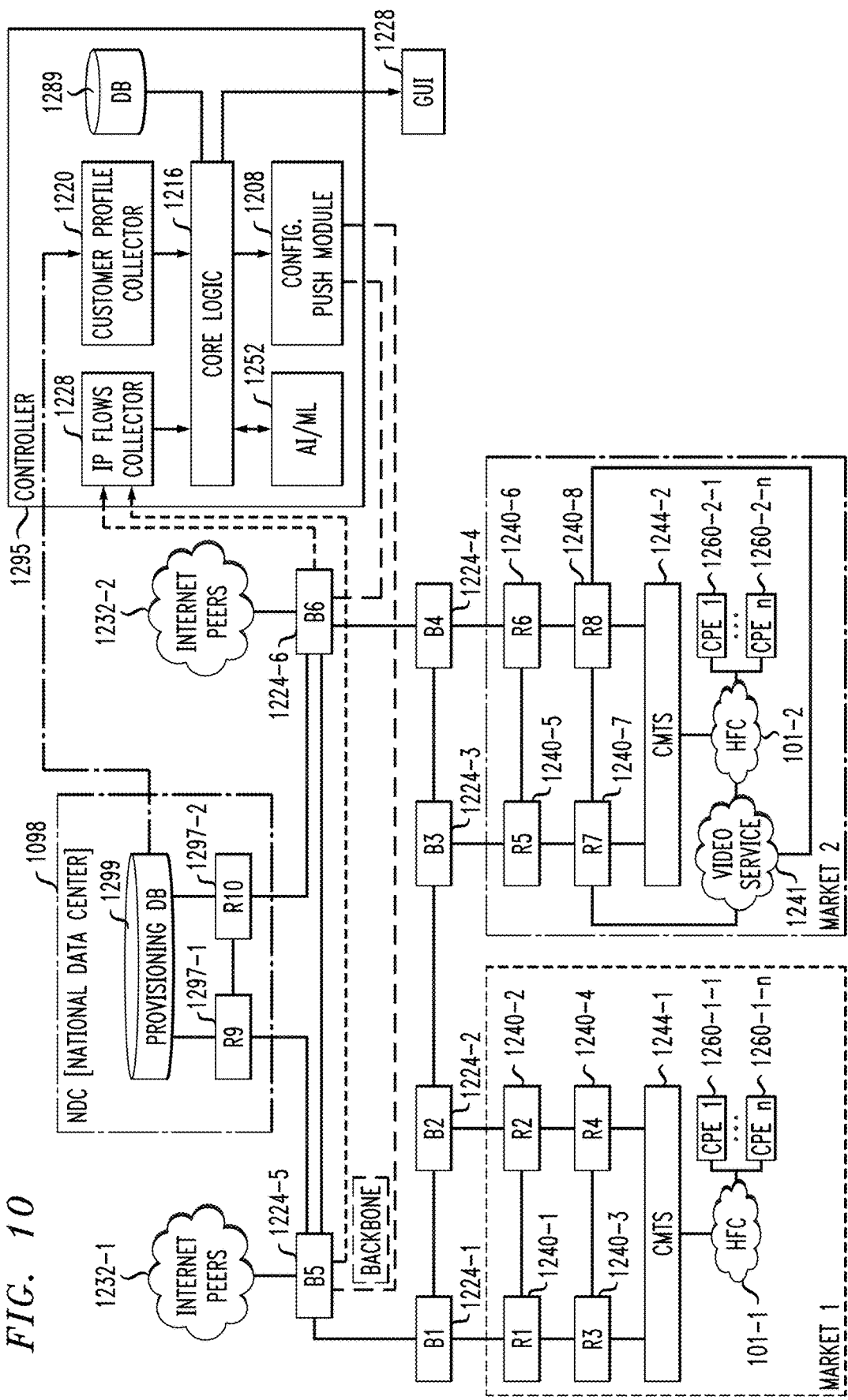
FIG. 10 is a block diagram of an exemplary network, in accordance with an exemplary embodiment.

Referring to FIG. 10, consider an exemplary network, according to an aspect of the invention. An entity such as an ISP (e.g., an MSO) has, for example, a backbone network including backbone routers B1, B2, B3, B4, B5, B6 numbered 1224-1, 1224-2, 1224-3, 1224-4, 1224-5, 1224-6. Comparing FIG. 10 to FIG. 1, backbone routers B1, B2, B3, B4, B5, B6 can be part of network 1046. It is worth noting that backbone routers B1-B4 can have other connections, such as to RDCs 1048, omitted in FIG. 10 to avoid clutter. A market such as, for example, Los Angeles, might have routers R5 and R6 as co-routers connecting to backbone routers B3 and B4 in a "main" head end (e.g., market center head end 1096), for example. However, the same head end might also have separate connections to backbone routers B2 and B4 in a regional data center 1048. FIG. 10 excludes the RDCs 1048 to focus on market level traffic. Routers B5 1224-5 and B6 1224-6 are Internet peering points and are shown connected to Internet peers 1232-1 and 1232-2, respectively. An ISP can have, for example, on the order of seven or eight peering points (where routers connect to the other ISPs (for example, Tier 1 providers)). A full Internet table is obtained from the peering routers B5 and B6 (by virtue of the peering with other ISPs) and that is how the customer associated with a given CPE is connected to the Internet. Note that Internet peers 1232-1 and 1232-2 are essentially different views of the same thing. In addition to peering with other ISPs, direct peering can be carried out, within the peers 1232-1 and 1232-2, with entities such as commonly-used search engine providers, providers of social networking services, providers of web services/cloud computing services, streaming video services, and the like.

Two markets are shown in the example, MARKET 1 and MARKET 2. Within a market, note the market-level routers R1, R2, R3, and R4 numbered 1240-1, 1240-2, 1240-3 and 1240-4 in MARKET 1 and the market-level routers R5, R6, R7, and R8 numbered 1240-5, 1240-6, 1240-7 and 1240-8 in MARKET 2. In the example, backbone router B1 is coupled to router R1, backbone router B2 is coupled to router R2, backbone router B3 is coupled to R3, and backbone router B4 is coupled to R4. Routers R3 and R4 are coupled to CMTS 1244-1 in MARKET 1 and routers R7 and R8 are coupled to CMTS 1244-2 in MARKET 2. In each market, note the progression from the CMTS 1244-1, 1244-2 down through the HFC network 101-1, 101-2 to the CPEs 1260-1-1 to 1260-1-n and 1260-2-1 to 1260-2-n.

Targeted distributed denial of service (DDOS) attacks can be a challenge. For example, there may be random sources from different locations outside the network (e.g., in one of the internet peer clouds 1232-1, 1232-2). A bad actor may attempt a denial of service attack (for example, sending a continuous stream of packets). A DDOS attack may result in an uncontrolled amount of aggregation bandwidth.

Consider, for example, a customer with a CPE 1260-1-1 to 1260-1-n or 1260-2-1 to 1260-2-n, who is allocated, for example, 100 Mbps service. Currently, peering points such as 1224-5, 1224-6 do not have any filters that would block a customer from receiving more than his or her assigned bandwidth. A bad actor seeking to carry out a DDOS attack against a single customer could negatively impact the entire network. Suppose CPE 1260-2-1 is targeted by a DDoS attack The DDOS traffic will come from different places to the destination IP. Since that IP address is publicly known, the attacker will try to send, for example, 1 Gbps traffic from each source. Due to the distributed nature of the attack, 1 Gbps of traffic could come from, for example, ten different places, resulting in a total of 10 Gbps of traffic coming in and hitting into the peering routers 1224-5, 1224-6, where it will end up using the ISP's bandwidth. A traffic volume on the order of 10 Gbps may not be a problem, for example, at the peering points 1224-5, 1224-6 because high bandwidth is typically available for peering and the issue may not be detected there. However, when proceeding deeper into the given market, the DDOS attack will start impacting the services, because the network couplings downstream in the markets have less capacity than further upstream at the peering routers/backbone (because the bandwidth available higher up in the network is distributed across the markets). In a typical case, the traffic from a DDOS attack could be on the order of 1 Tbps (terabits per second) targeting a single CPE (e.g., 1260-2-1). This volume of attack traffic will congest the downstream network links.

It is worth noting that the depicted markets can also include commercial "subleases." For example, there may be commercial subleases "hanging" off router R7 1240-7 and router R8 1240-8. Thus, a DDOS attack directed against (for example) a residential premises could also impact (for example) commercial service (for the avoidance of doubt, aspects of the invention are applicable to both residential and commercial customers). There is thus a challenge for an ISP. A further complication is that DDOS attacks can happen at any time of day. Peak times for residential traffic for an ISP are typically 4 PM to midnight (commercial customers can also have characteristic peak times). A bad actor may be able to determine what IP addresses an ISP is using in order to send the targeted DDOS attacks. Even further, not only data services may be impacted, but also video or voice services or the like—for example, suppose one or more DDOS attacks occur at the same time that there is a very popular television program being watched by many people.

With current technology, such a scenario may be difficult to control. Current tools may permit detecting the DDOS, but typically involve significant and unacceptable delay before the detection occurs, such that the response time is not acceptable. Current solutions may implement a static route to a destination but this may have limited utility. For example, a source of a DDOS attack may implement a 1 Tb burst of traffic for only a short period of time, after which the (distributed) attack continues from another source, complicating detection and mitigation.

Provisioning database 1299 (located, for example, in national data center 1098) typically includes pertinent information for each customer, such as what bandwidth is assigned to each customer. For example, residential (or commercial) customers may have different tiers of service. A "basic" tier might be 50 Mbps, as an example. An "advanced" tier could be 100 Mbps, for example. A 'fiber to the home' (FTTH) customer could have 1 Gbps, for example. National data center 1098 also includes routers R9 and R10 numbered 1297-1 and 1297-2, coupled to each other and to the database 1299, and respectively coupled to peering routers B5 and B6.

In one or more embodiments, controller 1295 uses customer profile collector 1220 to collect the IP address and assigned bandwidth for a given CPE/destination from database 1299. IP flow collector 1228 of controller 1295 determines the bandwidth being used by a particular CPE (say, a first 1 Gbps attack entering via B5 and a second 1 Gbps attack entering via B6 for a total of 2 Gbps). In this regard, traffic enters and leaves the ISP's network from/to the broader Internet via the peering routers B5 and B6. In one or more embodiments, controller 1295 is capable of rapidly responding to the DDOS attack in a time on the order of 1-10 milliseconds (ms).

In FIG. 10, the components other than the controller 1295 and GUI 1228, and their connections, are conventional components connected in a known manner. The controller 1295 includes IP flows collector 1228 and customer profile collector 1220 coupled to core logic module 1216. The controller 1295 further includes AI/ML module 1252 coupled to core logic 1216 and config push module 1208 coupled to core logic 1216. GUI 1228 is also coupled to core logic 1216. IP flows collector 1228 can be implemented using known open source collectors. In some cases, the IP flows collector 1228 is implemented using a NetFlow data collector where, for example, the routers B5 and B6 are configured to send data to the IP flows collector 1228, via a specified port, over a suitable networked or direct connection. NetFlow is a known feature of routers made by Cisco Systems, Inc., San Jose, CA, USA; NetFlow and similar technologies are known to the skilled artisan. Simple Network Management Protocol (SNMP) can be used for collection in one or more embodiments. The skilled artisan, given the teachings herein, can write a program to collect data from one or more ports based on known techniques. Customer profile data collector can be implemented using a suitable query structure compatible with the provisioning database; e.g., Structured Query Language (SQL) querying or the like, with a suitable networked or direct connection to the database 1299. The core logic module 1216 can be implemented, for example, using suitable high-level program code implementing the logical flows in the flow charts and compiled or interpreted into machine-executable code, and executing on one or more servers (virtualized of non-virtualized) or other hardware processors. Implementation of the AI/ML module, for example, by training a neural network, is discussed elsewhere herein. Config push module 1208 can be implemented, for example, by a PYTHON program (script) that implements the logic described herein to push the access control lists via a connection back to B5 and B6 initiated by Network Configuration Protocol (NETCONF), Secure Shell Protocol (SSH), or, for example, another suitable technique such as a cryptographic network protocol for operating network services securely over an unsecured network. That is to say, module 1208 logs into routers B5 and B6 and pushes the ACLs thereto. The GUI 1228 can be implemented using known techniques such as HTML served out by a server implementing the core logic 1216 to a client device with a browser. The connections between core logic 1216 and elements 1228, 1220, 1252, 1208 can be physical connections or logical connections via shared data structures or the like.

Figure 12:
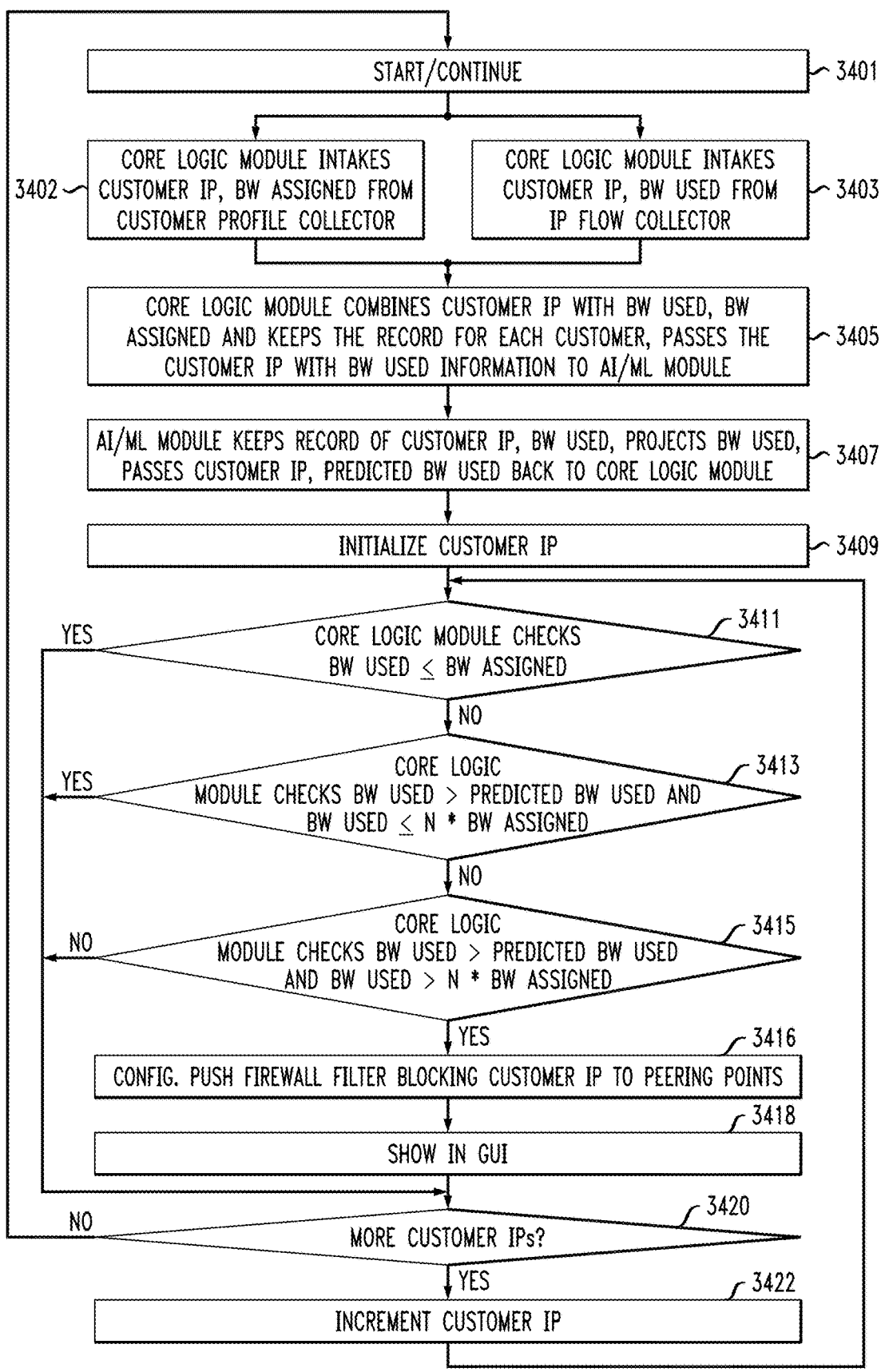
FIG. 12 is a flowchart for an exemplary method, in accordance with an exemplary embodiment.

Referring to the flow chart of FIG. 12, begin/continue monitoring at 3401. In one or more embodiments, in step 3402, customer profile collector 1220 collects the customer data (including IP address and assigned bandwidth) and passes this information to the core logic module 1216. In step 3403, IP flow collector 1228 collects the IP flow data (BW used per customer IP at each peering point) across the peering routers B5 and B6 and passes this information to the core logic module 1216 (in one or more embodiments, IP flow collector 1228 sums the BW used by a given IP address across all the peering points (e.g., B5 and B6)). In step 3405, the core logic module 1216 has obtained the actual bandwidth usage per customer based on the IP flow data from collector 1228 and has also obtained the assigned BW from the customer profile collector, and it passes this information (including the identity of the bandwidth user) to the AI/ML module 1252. In step 3407, module 1252 carries out inferencing with the trained neural network or other AI/ML system to determine the projected bandwidth based on actual past usage. The projected "normal" bandwidth based on the inferencing is returned to the core logic module 1216. It is worth noting that in one or more embodiments, the AI/ML module 1252 carries out inferencing based on the past (normal) usage, and so does not use the current/instantaneous bandwidth for inferencing. However, in one or more embodiments, the current/instantaneous bandwidth is used as a data point for updating the model for use for future inferencing (for example, store in database 1289), unless it is believed to be abnormal due to a DDOS attack. See discussion of FIG. 13.

Consider that during normal operation (i.e., not a DDOS attack), a user might use 10-50 Mbps out of 100 Mbps assigned, for example. This usage would tend to fluctuate over the course of a 24 hour period. In one or more embodiments, the current usage is passed to module 1252. Module 1252 predicts expected usage based on historical usage. The core logic module 1216 compares actual, predicted, and assigned usage, using, for example, exemplary logic to be discussed below in connection with decision blocks 3411, 3413, 3415 (or other suitable logic). When there is a significant discrepancy (e.g., assigned 100 Mbps, predicted 50 Mbps, actual 1 Gbps), a DDOS attack may be suspected and an alert can be issued, all done rapidly (e.g., within 1-10 ms). Referring to step 3409, the checking can be done for each customer IP address. The customer IP address can be "initialized" in step 3409, the checks carried out, and then a check is made in decision block 3420 whether there are more customer IP addresses to check. If yes, "increment" the customer IP address in step 3422 and perform the checks for the next customer IP address until all customer IP addresses have been checked, then continue to monitor for the next time interval (i.e., by following "NO" branch of decision block 3420 back to start/continue step 3401. Note that the words "initialized" and "increment" are enclosed in quotes as the IP address is not a simple integer to be incremented; the words in quote marks merely convey that the checks are typically done for all customers. Further, the logic could step through the customers based on a customer identifier other than IP address, and the logic can step through the customers in any desired order.

Referring now to step 3416 of FIG. 12, assuming that core logic module 1216 determines, based on logic to be discussed, that a DDOS attack is suspected, config push module 1208 responds to the suspected DDOS attack by pushing access control lists (ACLs) to all the peering routers B5, B6 to block the malicious traffic (or config push module 1208 takes other suitable filtering action). Config push module 1208 can include, for example, predefined templates (in the form of ACLs, for example). The "push" can thus be carried out to push the new rule (responsive to the suspected DDOS attack) back to both the peering points B5 and B6. These ACLs will then be applied on B5 and B6 to block the traffic for the customer associated with the DDOS attack. The architecture illustrated in FIG. 10 advantageously allows rapid blocking of the DDOS attack. For example, a 1 Gbps attack intended by the bad actor to last for several minutes could be quickly shut down in a time on the order of 1-10 ms to limit negative impact.

Figure 11:
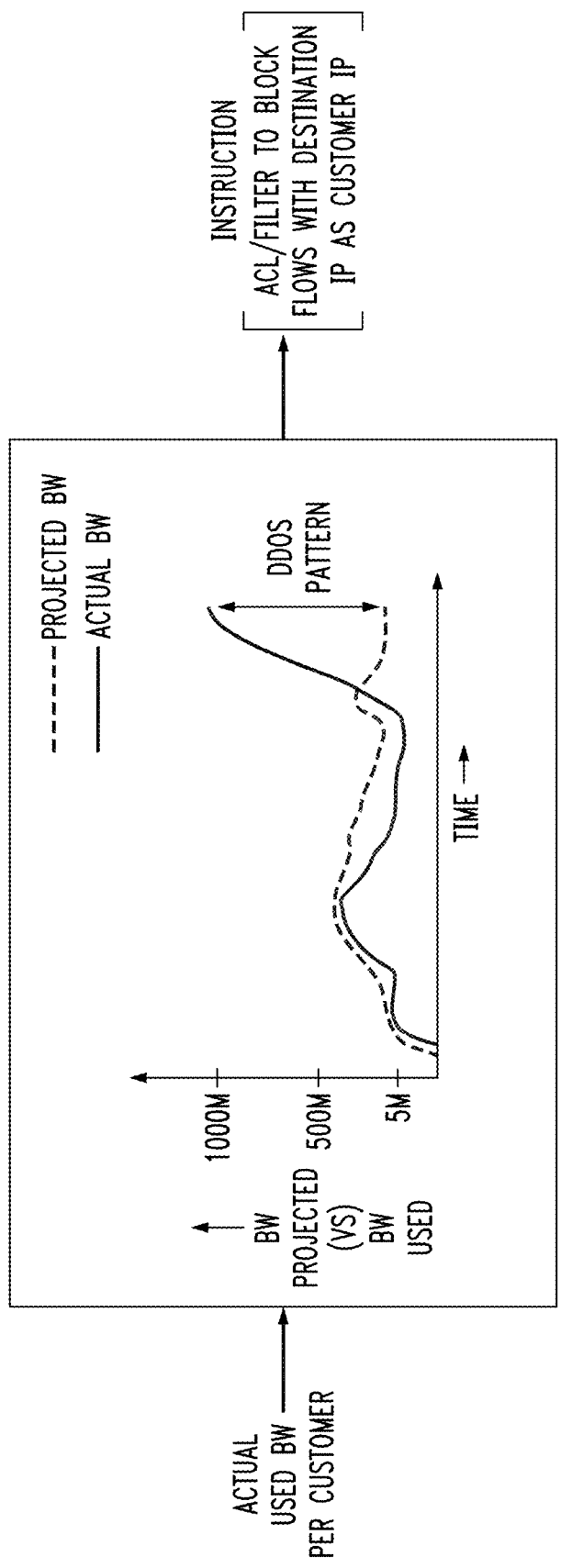
FIG. 11 is an illustration of exemplary "Level 2" output of a graphical user interface (GUI), in accordance with an exemplary embodiment.
Figure 14:
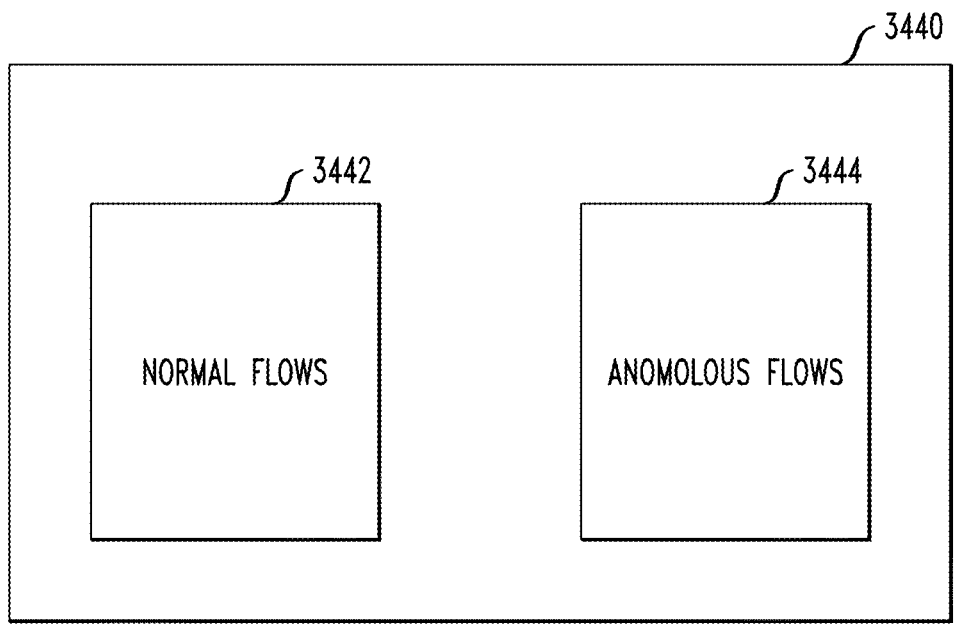
FIG. 14 is an illustration of exemplary "Level 0" output of a graphical user interface (GUI), in accordance with an exemplary embodiment.
Figure 15:
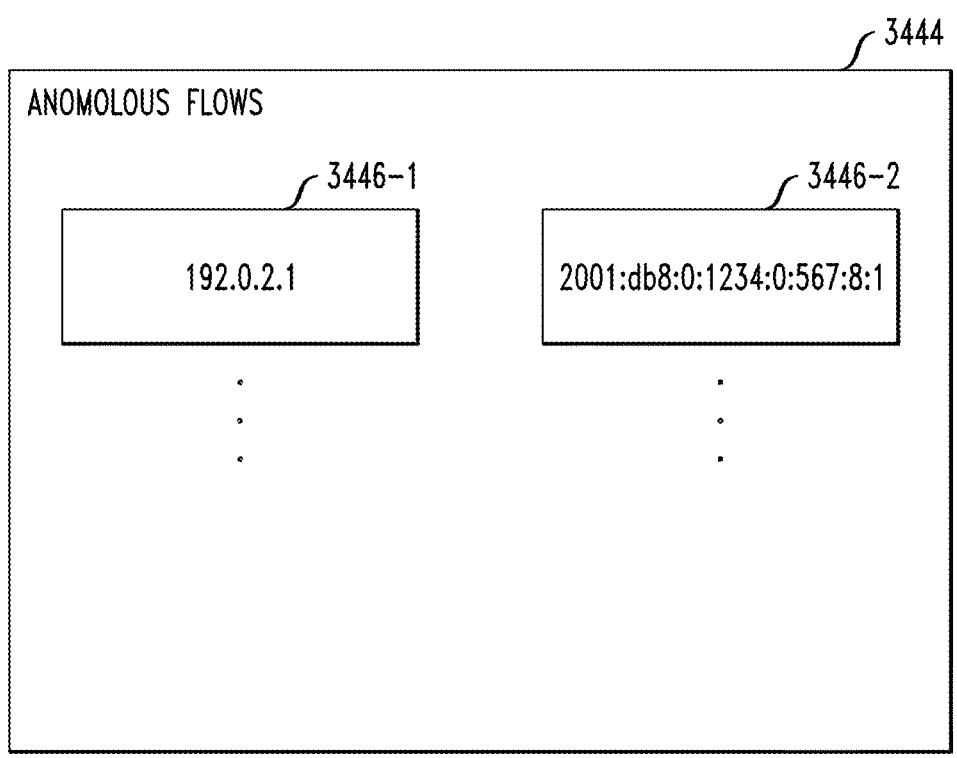
FIG. 15 is an illustration of exemplary "Level 1" output of a graphical user interface (GUI), in accordance with an exemplary embodiment.

In step 3418, the core logic module 1216 provides to the GUI 1228 information regarding those customers currently believed to be undergoing a DDOS attack (e.g., data to be plotted as in FIG. 11; see also discussion of FIGS. 14 and 15).

In addition to blocking a customer, ACLs can be applied not only at the IP layer (OSI Layer 3) but even at the TCP/UDP layer (OSI Layer 4). For example, in a first, IP-based use case, the customer is blocked from any internet access. In a second, TCP/UDP-based use case (employing an extended ACL), traffic is blocked on a specific port via which the customer is being attacked. In this second use case, the malicious traffic is blocked but the customer can still connect to the Internet. Given the teachings herein, the skilled person will be able to block an entire IP address or just one or more specific ports. Thus, step 3416 generally represents blocking a whole IP address or just one or more ports.

One or more embodiments employ AI/ML module 1252 to predict what amount of bandwidth the customer would be expected to use based on the customer's previous usage and this is then used by the core logic module to determine when there is a significant anomaly, such as when the customer is using much more bandwidth than would be expected. In one or more embodiments, a distributed denial of service (DDOS) attack is suspected of being launched against that customer under such circumstances.

Consider now the GUI 1228 and refer to FIG. 11 (graphical representation based on the actual usage and the projected usage from inference by the AI/ML module 1252). The "DDOS Pattern" reflects a "large" excess of actual bandwidth over predicted bandwidth. However, such an excess is not necessarily dispositive with regard to occurrence of a DDOS attack. For example, the customer could have a higher than normal volume of legitimate traffic (say, 150 Mbps compared to assigned 100 Mbps because the customer is legitimately downloading an application). This situation can be handled, for example, using the "N" factor of FIG. 12 (for example, to determine whether the excess is so "large" as to require a remediation.

Consider now the exemplary logic in decision blocks 3411, 3413, 3415. The core logic module 1216 has obtained the customer IP address and bandwidth (BW) assigned information from the customer profile collector 1220 and the customer IP address and bandwidth (BW) used information from the IP flow collector 1228. The core logic module has combined the customer IP address with the BW used and BW assigned information and maintained a record for each customer (e.g., in a suitable database 1289 coupled to the core logic module 1216), and has passed the customer IP address with BW used information to the AI/ML module 1252. The AI/ML module 1252 has maintained a record (e.g., in database 1289 through the core logic module 1216 or there can be a direct coupling between the AI/ML module 1252 and the database 1289 (not shown to avoid clutter) or a separate database can be used) of the customer IP address and BW used, and has used prediction algorithms (e.g., a trained neural network) to project BW used; this information (customer IP address, predicted BW used) is passed back to the core logic module 1216. In one or more embodiments, in decision blocks 3411, 3413, 3415, for each customer IP address, the core logic module 1216 compares the BW assigned against the BW used and the predicted BW used values.

In decision block 3411, if the bandwidth used for a given IP address is less than or equal to the bandwidth assigned to the given IP address ("YES" branch), no action is need by the config push module 1208 and logical flow proceeds to step 3420 to see if there are more customer IP addresses that need to be checked. In decision block 3413 (reached via "NO" branch of decision block 3411), if the bandwidth used for the given IP address is greater than the predicted bandwidth for the given IP address and the bandwidth used for the given IP address is also less than or equal to N times the bandwidth assigned to the given IP address ("YES" branch), again, no action is need by the config push module 1208 and logical flow proceeds to step 3420 to see if there are more customer IP addresses that need to be checked. In decision block 3415 (reached via "NO" branch of decision block 3413), if the bandwidth used for the given IP address is greater than the predicted bandwidth for the given IP address and the bandwidth used for the given IP address is also greater than N times the bandwidth assigned to the given IP address, then the config push module 1208 takes action in step 3416, reached by the "YES" branch of decision block 3415. In particular, a config push is undertaken—for example, a firewall filter blocking traffic bound for the customer's IP address is pushed to all the peering routers B5, B6 to mitigate the DDOS attack. However, if decision block 3415 yields a "NO," logical flow proceeds to step 3420 to see if there are more customer IP addresses that need to be checked.

Consider a case where the customer has an assigned 100 Mbps bandwidth and the customer currently has 1 Gbps of traffic (say, across all the ISP's peering entry routers), such that the bandwidth used is greater than the bandwidth assigned. Suppose further that the BW being used is greater than the predicted BW (say, predicted BW is 90 Mbps). Therefore, block 3411 is not applicable (yields a "NO") but either block 3413 or 3415 could be applicable, depending on the value of N. If the value of N is 10, since 1 Gbps (BW used) is 10 times the assigned 100 Mbps, the expression (BW used ≤N times BW assigned) is satisfied and block 3413 yields a "YES" so no action is needed. On the other hand, if the value of N is 9, since 1 Gbps (BW used) is 10 times the assigned 100 Mbps, the expression (BW used ≤N times BW assigned) is not satisfied and block 3413 yields a "NO" so remediation action is needed.

The N value can be adjusted based on historical data to increase the probability that remedial actions are addressing "real" DDOS attacks and not reacting to legitimate, temporary high bandwidth usage. A variety of techniques can be used to pick "N," as will be appreciated by the skilled artisan, given the teachings herein. In a non-limiting example, select a certain starting value, run an embodiment of the inventive system for a week (or other predetermined period of time), and see how many remediations were for "real" DDOS attacks and how many were for some legitimate use of BW (i.e., false alarm). Then, iterate with different values of N until a desired result is obtained where too many "real" attacks are not missed and too many "false alarms" are not remediated. If there are too many false alarms, increase N; if too many "real" attacks are missed, decrease N. In a non-limiting example, start at N=2. If, during the predetermined test time period, there are not too many missed "real" attacks and not too many "false alarms," settle on N=2. If there are too many false alarms, double N to N=4 and test again. If, during the predetermined test time period with updated N=4, there are not too many missed "real" attacks and not too many "false alarms," settle on N=4. If there are too many false alarms, double N again to N=8 and test again, and continue with doubling (16, 32, . . . ), as needed, until a satisfactory result is obtained. Note, for an initial value of N=2, it is believed highly unlikely that there would be too many missed "real" attacks, so that it is believed very unlikely that a value of N=2 would ever need to be decreased. The balance between not too many missed "real" attacks and not too many "false alarms" can be checked periodically and N can be adjusted. If N needs to be reduced from some higher value (say, N=16), it can be halved to 8, halved again to 4, and so on, until satisfactory results are achieved. N can be increased/decreased using other (i.e., other than doubling/halving) arithmetic, multiplicative, or exponential techniques in other embodiments.

In one or more embodiments, AI/ML module 1252 is trained on historical data (a training corpus) before usage to project bandwidth based on past usage. Then, the trained system is deployed to carry out inferencing on current data and predict bandwidth.

Figure 13:
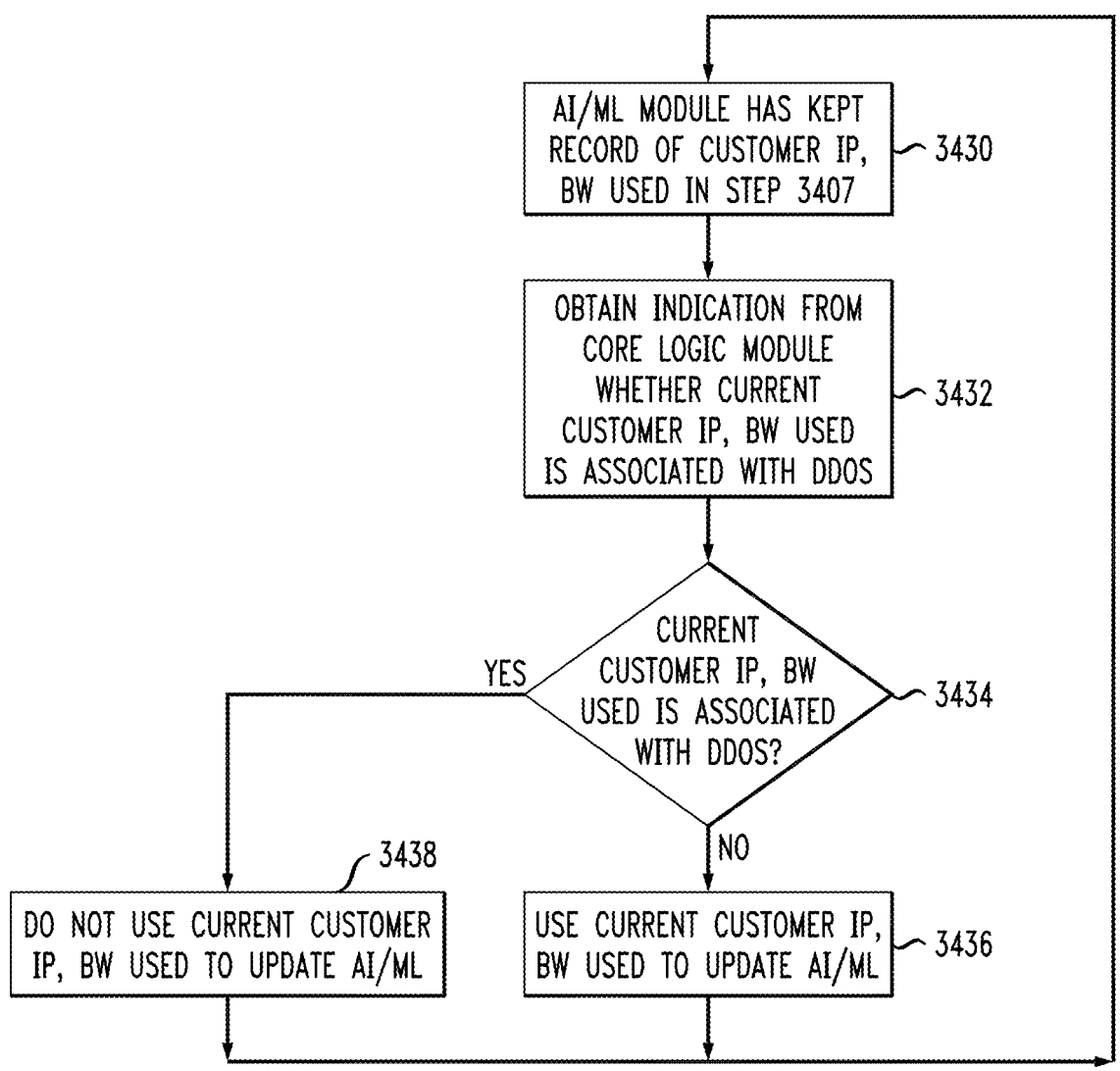
FIG. 13 is a flowchart for additional aspects of an exemplary method, in accordance with an exemplary embodiment.

The comparisons and actions in blocks 3411, 3413, 3415 of FIG. 13 can be implemented by the core logic module 1216 using known high-level programming language techniques such as IF-THEN or IF-THEN-ELSE statements, with the code compiled or interpreted into executable form (in one or more embodiments, using high level code compiled or interpreted into machine-executable code and executed on one or more hardware processors). In one or more embodiments, the config push module 1208 is pre-populated with the addresses of the peering routers B5 and B6 so that whenever it receives an instruction from the core logic module to issue an ACL, it sends the ACL to all the peering routers. The module 1208 can be, for example, a simple PYTHON program which establishes a NETCONF (or similar) session with all the peering routers B5 and B6 and pushes the ACL to the peering routers based on the input from the core logic module.

IP Flow collector 1228 can be implemented with existing technologies (e.g., existing open source flow collector program, or custom program implementing actions described herein, running on one or more hardware processors, based on IP flow data and bandwidth using, for example, NetFlow data or Internet Protocol Flow Information Export (IPFIX)). Existing tools can thus be used to consolidate flows (i.e., add traffic from many different outside sources (can be, for example, 2 or more) that make up the DDOS attack) and determine total bandwidth currently being used by a given customer IP address. That value is then pushed from the collector 1228 down to the core logic module 1216. More specifically, for example, in one or more embodiments, the existing tools can be used to collect the data and the collector 1228 can use a custom program, running on one or more hardware processors, to carry out the addition.

It should be noted that data obtained on an ongoing basis can be used to continually update the AI/ML module 1252. However, in one or more embodiments, when a DDOS attack is noted, the anomalous data is not used to update the AI/MI module since it would provide false data as to expected normal bandwidth utilization. That is to say, one or more embodiments continuously refine the machine learning. However, when a DDoS attack is detected, the AI/ML 1252 module is not permitted to train on that anomalous data, since doing so would give it an artificial sense of how much bandwidth a customer should normally be using.

Referring to the flow chart of FIG. 13, in step 3430, the AI/ML module has kept a record of the Customer IP address and BW used in step 3407. In step 3432, the AI/ML module obtains an indication from the core logic module regarding whether the current Customer IP address and BW used are from "normal" operation or a suspected DDOS attack (alternatively, it can be assumed that all such data points are "normal" and an indication can be sent only when a DDOS attack is suspected). If the answer is YES, proceed to step 3438 and do not use the current data point for training. On the other hand, if the answer is NO, then do use the current data point for training. In each case, proceed back to step 3430 for the next data point. The logic in the flow chart of FIG. 13 can be implemented, for example, using logic in the AI/ML module, implemented, for example, by programming in a high level language and compiling or interpreting into machine-executable code.

In one or more embodiments, the instruction in FIG. 11 (i.e., to block) is obtained from the core logic module 1216. In one or more embodiments, GUI 1228 obtains data from the core logic module, and projects (i) Customer IP address, (ii) assigned bandwidth for that customer IP address, and (iii) bandwidth currently being used for that customer IP address. An operator (e.g., operations engineer), observing the GUI, will be able to note different flows and see deviations. Deviations suspected to be a DDOS attack can, for example, be depicted in a contrasting color. Various types of views can be provided by the GUI 1228. For example, a multilevel view can be provided with a high level (say, level 0) showing both normal IP flows and DDOS/anomalous IP flows and a low level (say, level 1) reached by clicking (e.g., by an operations engineer) on a given DDOS/anomalous IP flow in level 0, which would then depict, for example, all the actual CPEs that are currently under attack, those that have been attacked in the past, and what ACLs have been applied. Thus, advantageously, the operations engineer does not have to manually log in to each peering router B5, B6 to determine the applied ACLs. Referring to FIG. 14, consider a "Level 0" display 3440 wherein the operations engineer can click on icon 3442 for more details about IP addresses with normal flows, or can click on icon 3444 for more details about IP addresses with anomalous flows. Referring to FIG. 15, if the operations engineer clicks on the anomalous flows icon 3444, she or he can be presented with a "Level 1" view showing a number of individual icons 3446-1, 3446-2, . . . . Only two are shown to avoid clutter, 3446-1 corresponding to an IPv4 address with anomalous flows and 3446-2 corresponding to an IPv6 address with anomalous flows. The operations engineer then clicks on one of the individual icons 3446-1, 3446-2, . . . and obtains a "Level 2" view such as in FIG. 11 for the corresponding IP address. The GUI screens can be implemented in a known manner; for example, by serving out HTML to a browser. A screen similar to FIG. 15 could be presented when clicking on the icon for the normal flows.

In FIG. 10, note video service 1241 connected to routers R7 1240-7 and R8 1240-8. Note that video service 1241 is illustrated as a cloud because it is typically a cluster of devices. Typically, voice and data services travel across a CMTS such as 1244-2 through the HFC plant such as 101-2. For the video service 1241, a video device, such as, for example, a high-density universal edge QAM system (e.g., NARROWCAST SERVICES GATEWAY (NSG) device— trademark of Harmonic Inc., San Jose, CA, US), takes the IP multicasting and has a connection to the HFC network 101-2. Typically, data, video, and voice all have separate space in the RF spectrum. In one or more embodiments, video is inserted through video devices not CMTS-es. The CPE offered to the customer (e.g., 1260-2-1, . . . , 1260-2-*n*) typically also has a port for voice. For video insertion, one or more embodiments employ IP multicasting, which is converted to RF and multiplexed into the HFC network 101-2 in a known manner. When DDOS attacks come from outside the ISP's network, into, for example, R7, R7 may also be receiving an IP multicast towards the video device (e.g., edge QAM) and that video traffic might also be impacted by the DDOS. Thus, an IP multicast video may be impacted by the DDOS unless proper quality of service (QoS) is applied. The skilled person is familiar with the use of edge QAM systems/devices to implement video service.

It will thus be appreciated that a DDOS attack may potentially interfere not only with data but also with other services such as video and/or voice. Thus, advantageously, one or more embodiments not only improve DDoS detection and prevention for the benefit of high-speed data services, but also improve the customer service experience for other services, such as video and/or voice, provided over an ISP's network, such as a content-based network. In one or more embodiments, additional services such as video service 1241 may employ the same uplinks and bandwidth as the data services, as discussed above. Voice and video can be logical rather than physical domains in one or more embodiments. For example, a video service may have a number of different components such as edge QAM video devices which will stream the multicast. Thus, a DDoS attack potentially not only affects the high speed data service, but potentially other services provided by the network, such as voice and/or video. For example, when a customer is undergoing a DDOS attack, the attack can also cause tiling issues with the customer's video. Furthermore in this regard, a router typically has limited resources on the incoming and outgoing router interface queues; if there is too much traffic coming in without proper quality of service (QoS) applied (at the peering points, e.g.), the abilities of the router may be impacted. That is to say, if there is too much traffic hitting the router, packets may be dropped, causing video tiling and/or voice quality issues. For illustrative convenience, only routers R7 and R8 are shown with associated video service 1241, but any one, some, or all of routers such as R3, R4, R7, and R8 can support such services.

One or more embodiments advantageously provide response time (for detection and remediation) on the order of 1-10 ms, enabled by the core logic module and its interconnections.

Referring to FIG. 12, even if the predicted bandwidth was not available, the BW assigned and BW used could be compared such as in decision block 3411, or in an alternative manner (for example, BW used is greater than BW assigned by a certain multiplicative or additive factor set to detect most actual attacks while reducing false alarms to an acceptable level).

Thus, it will be appreciated that distributed denial of service (DDOS) attacks are becoming very challenging for ISPs in terms of detecting and providing quick mitigation response for customers. DDOS attacks also potentially cause other service degradation issues. One or more embodiments provide a quick detection and workaround solution; this helps in avoiding unnecessary traffic into the ISP's core network, and this also helps in avoiding congestion impacting legitimate traffic.

One or more embodiments provide an apparatus (e.g., controller 1295) that collects customer data (assigned bandwidth, customer IP) from a provisioning database 1299, and also collects per customer IP flows data (e.g., via collector 1228) from all peering entry routers in the ISP. A core logic module 1216 takes the above mentioned information and an AI/ML module 1252 runs AI/ML algorithms that output projected bandwidth usage per customer back to the core logic module. The core logic module then sends an instruction via push module 1208 to apply a filter/ACL to block the IP flows with the destination IP address the same as the IP address of the customer that is being hit with the DDOS attack, if certain conditions are satisfied. For example, as per decision blocks 3411, 3413, and 3415, if actual bandwidth usage is more than the predicted bandwidth usage and actual bandwidth usage is greater than N times assigned BW, the apparatus will carry out a config push to block the malicious flows on all the peering routers.

Recapitulation

Given the discussion thus far, it will be appreciated that, in general terms, an exemplary method, according to an aspect of the invention, includes obtaining, by a controller 1295, from at least one provisioning database 1299 of an internet service provider, assigned bandwidth per customer for a plurality of internet service provider customers. Refer to step 3402. The skilled artisan will appreciate that in some instances, there can be multiple CPE per customer. The skilled artisan will further appreciate that each customer typically has a unique MAC address. In one or more embodiments, the provisioning system, which includes provisioning database 1299, uses the hardware MAC address (a permanent address associated with hardware) and will know the assigned bandwidth tier for the corresponding customer. The customer is assigned an IP address, which can be changeable.

A further step 3403 includes the controller 1295 obtaining, from a plurality of peering entry points (e.g., routers B5 and B6, but can generally be routers or other equipment) of the internet service provider, currently used bandwidth per customer for the plurality of internet service provider customers. In a non-limiting example, the "raw" data will include bandwidth by IP address at each peering point. The IP address can be mapped to the customer from a table including the assigned IP address, MAC address, and Customer identifier (ID). Summation can be carried out, as discussed, to add up the bandwidth per IP address at each peering point and obtain a total. For example, add the inbound traffic to IP address 1.0.1 at B5 and the inbound traffic to IP address 1.0.1 at B6 to obtain total inbound traffic to IP address 1.0.1. In one or more embodiments, IP flow collector 1228 sums the BW used by a given IP address across all the peering points (e.g., B5 and B6).

An even further step includes the controller 1295 comparing, for the plurality of internet service provider customers, the assigned bandwidth per customer to the currently used bandwidth per customer, to determine at least one given customer of the plurality of internet service provider customers putatively suffering from a distributed denial of service attack. Refer to decision block 3411, with the understanding that optionally, a series of comparison can be performed, also involving predicted bandwidth. Note further that in an embodiment where predicted bandwidth is not considered, a different comparison between BW used and BW assigned than that set forth in decision block 3411 could be used, as set forth elsewhere herein (for example, BW used is greater than BW assigned by a certain multiplicative or additive factor set to detect most actual attacks while reducing false alarms to an acceptable level).

Yet a further step 3416 includes the controller 1295 initiating at least one remedial action for the at least one given customer of the plurality of internet service provider customers putatively suffering from the distributed denial of service attack (e.g., via a config push to the peering points B5 and B6).

Referring to step 3407 and decision blocks 3413 and 3415, one or more embodiments further include the controller 1295 determining, for the plurality of internet service provider customers, a projected bandwidth per customer, in which case the comparing step further includes comparing the currently used bandwidth per customer to the projected bandwidth per customer. Note that this aspect does not necessarily require the use of machine learning; in alternative approaches, the projection could be carried out using a curve fit, table lookup, PYTHON (or other) linear progression program, or the like. Of course, in one or more embodiments, as discussed, the controller determines the projected bandwidth per customer or the plurality of internet service provider customers using machine learning for example, by carrying out inferencing with a trained neural network, which is trained on historical data to project the bandwidth per customer based on measured data). Accordingly, one or more embodiments further include training the neural network on the historical data to project the bandwidth per customer.

As noted, the training of the neural network can be updated over time for those of the plurality of customers other than the at least one given customer putatively suffering from the distributed denial of service attack. See, for example, FIG. 13 and accompanying text for exemplary logic to determine when to include a data point in the updated training.

Referring again to the exemplary decision blocks 3411, 3413, and 3415, in one or more embodiments, the comparing step includes determining that the at least one given customer putatively suffers from the distributed denial of service attack when the currently used bandwidth per customer for the at least one given customer exceeds the projected bandwidth per customer for the at least one given customer (NO branch of block 3411) and (block 3415 reached via NO branch of block 3411 and NO branch of block 3413) the currently used bandwidth per customer for the at least one given customer is at least equal to: (i) the assigned bandwidth per customer for the at least one given customer; and (ii) an additional applied amount. In the example depicted in FIG. 12, in the comparing step, the additional applied amount is determined multiplicatively. That is, the comparison is to N times the assigned bandwidth, so the additional applied amount is effectively (N−1) times the applied bandwidth. However, this is not intended to be limiting and the additional applied amount could be determined in a different manner, such as additively. It is believed that a multiplicative safety factor is better than an additive safety factor in cases where there are multiple tiers of service, such as 10 Mbps, 50 Mbps, 100 Mbps, 200 Mbps, . . . 1 Gbps. Furthermore, a variable additive factor could be employed, depending on the tier of service, such as add 2 Mbps to 10 Mbps tier, 10 Mbps to 50 Mbps tier, and so on.

In one or more embodiments, referring to step 3416, the at least one remedial action initiated by the controller includes the controller pushing a configuration to the plurality of peering entry points to cause the plurality of peering entry points to block at least one of an IP address and a port associated with the putative distributed denial of service attack. See discussion elsewhere herein indicating that extended ACLs can be applied not only at the IP layer (OSI Layer 3) but even at the TCP/UDP layer (OSI Layer 4). One or more embodiments further include the plurality of peering entry points (e.g., B5 and B6) blocking the at least one of an IP address and a port associated with the putative distributed denial of service attack in accordance with the pushed configuration.

In a non-limiting example, as depicted in FIG. 10, the controller 1295 includes a core logic module 1216, an IP flows collector 1228 coupled to the core logic module, a customer profile collector 1220 coupled to the core logic module, a machine learning module 1252 coupled to the core logic module, and a configuration push module 1208 coupled to the core logic module. The IP flows collector 1228 and the configuration push module 1208 can be coupled to the peering points B5 and B6. The customer profile collector 1220 can be coupled to the at least one provisioning database 1299. In one or more embodiments, the controller 1295 obtains the assigned bandwidth per customer for the plurality of internet service provider customers via the customer profile collector 1220 querying the at least one provisioning database 1299; the machine learning module 1252 implements the trained neural network; and the controller obtains the currently used bandwidth per customer via the IP flows collector 1228 obtaining the currently used bandwidth per customer from the plurality of peering entry points B5, B6 of the internet service provider. The IP flows collector 1228 can sum the flows across the peering points (or that summation could take place elsewhere, such as in the core logic module 1216). In one or more embodiments, the controller carries out the comparison via the core logic module 1216 obtaining the assigned bandwidth per customer from the customer profile collector 1220, the core logic module 1216 obtaining the currently used bandwidth per customer from the IP flows collector 1228, the core logic module 1216 obtaining the projected bandwidth per customer from the machine learning module 1252, and the core logic module 1216 comparing the assigned bandwidth per customer to the currently used bandwidth per customer and the currently used bandwidth per customer to the projected bandwidth per customer. Further, in one or more embodiments, the controller 1295 initiates the at least one remedial action via the configuration push module 1208 pushing the configuration (e.g., to the peering points B5 and B6).

One or more embodiments further include displaying, on a graphical user interface 1228, data related to the putative distributed denial of service attack. Refer to FIGS. 11, 14, and 15 and accompanying text.

One or more embodiments can include additional aspects such as appropriate storage in/retrieval from database 1289, use of NetFlow technology or other suitable technologies as discussed, and the like.

In another aspect, an exemplary system (e.g., controller 1295) includes a memory (e.g., 730 as discussed elsewhere herein); and at least one processor (e.g., 720 as discussed elsewhere herein), coupled to the memory, and operative to carry out or otherwise facilitate any one, some, or all of the method steps described herein. Furthermore, instructions in the memory can configure the processor to instantiate desired components; for example, a core logic module 1216, an IP flows collector 1228 coupled to the core logic module, a customer profile collector 1220 coupled to the core logic module, a machine learning module 1252 coupled to the core logic module, and a configuration push module 1208 coupled to the core logic module. IN a non-limiting example, coupling to external components can be via a network and coupling to internal components can be via shared data structures.

In still another aspect, an exemplary system includes a customer profile collector 1220 configured to obtain, from at least one provisioning database 1299 of an internet service provider, assigned bandwidth per customer for a plurality of internet service provider customers (for example, by querying the at least one provisioning database). Also included are an IP flows collector 1228 configured to obtain, from a plurality of peering entry points (e.g., B5, B6) of the internet service provider, currently used bandwidth per customer for the plurality of internet service provider customers; and a core logic module 1216, coupled to the customer profile collector and the IP flows collector. The core logic module is configured to compare, for the plurality of internet service provider customers, the assigned bandwidth per customer to the currently used bandwidth per customer, to determine at least one given customer of the plurality of internet service provider customers putatively suffering from a distributed denial of service attack. The system still further includes a configuration push module 1208, coupled to the core logic module, and configured to initiate at least one remedial action for the at least one given customer of the plurality of internet service provider customers putatively suffering from the distributed denial of service attack (for example, by pushing the configuration).

One or more embodiments further include a machine learning module 1252, implementing a trained neural network, coupled to the core logic module, and configured to determine, for the plurality of internet service provider customers, a projected bandwidth per customer, by carrying out inferencing with the trained neural network. The trained neural network is trained on historical data to project the bandwidth per customer based on measured data. The core logic module is further configured to compare the currently used bandwidth per customer to the projected bandwidth per customer to determine the at least one given customer of the plurality of internet service provider customers putatively suffering from the distributed denial of service attack.

In some instances, the core logic module is configured to determine the at least one given customer of the plurality of internet service provider customers putatively suffering from the distributed denial of service attack when the currently used bandwidth per customer for the at least one given customer exceeds the projected bandwidth per customer for the at least one given customer and the currently used bandwidth per customer for the at least one given customer is at least equal to: (i) the assigned bandwidth per customer for the at least one given customer; and (ii) an additional applied amount.

In one or more embodiments, the configuration push module 1208 is configured to initiate the at least one remedial action for the at least one given customer of the plurality of internet service provider customers putatively suffering from the distributed denial of service attack by pushing a configuration to the plurality of peering entry points (e.g., B5, B6) to cause the plurality of peering entry points to block at least one of an IP address and a port associated with the putative distributed denial of service attack.

In one or more embodiments, the system further includes any one, some, or all of the additional components shown in FIG. 10. For example, in one or more embodiments, the system further includes the plurality of peering entry points (e.g., B5 and B6). The plurality of peering entry points are configured to block the at least one of an IP address and a port associated with the putative distributed denial of service attack in accordance with the pushed configuration. For example, one or more embodiments further include a graphical user interface 1228 coupled to the core logic module and configured to display data related to the putative distributed denial of service attack.

The customer profile collector 1220, IP flows collector 1228, core logic module 1216, configuration push module 1208, and machine learning module 1252, can be implemented, for example, using software implementing the logic/algorithms discussed herein on at least one hardware processor, or can be implemented, at least partially, using hardware aspects such as digital logic circuitry implementing the logic/algorithms discussed herein.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 7:
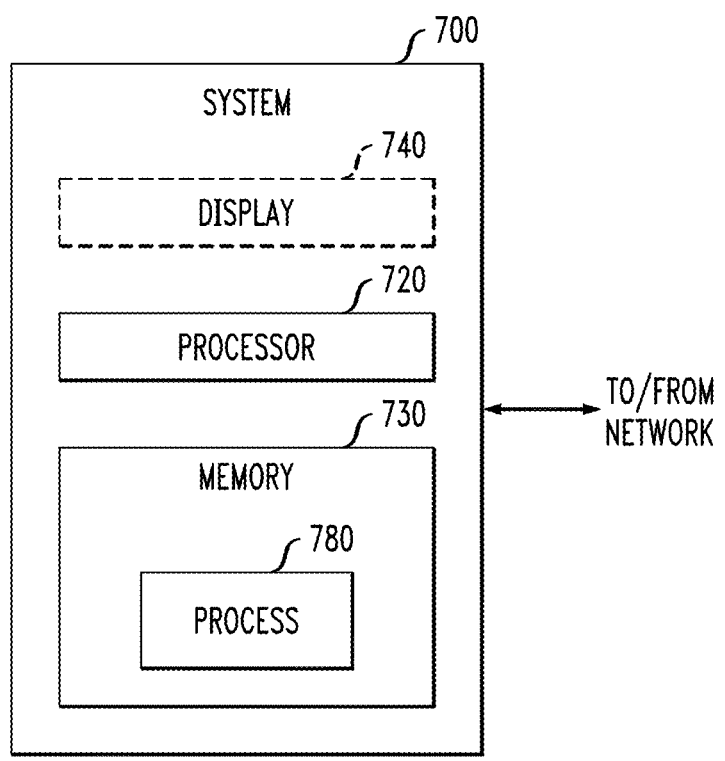
FIG. 7 is a block diagram of a computer system useful in connection with one or more aspects of the invention.

FIG. 7 is a block diagram of at least a portion of an exemplary system 700 that can be configured to implement at least some aspects of the invention, and is representative, for example, of one or more of the apparatus or modules shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors, either concurrently (i.e., in parallel) or sequentially (i.e., in series).

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
    obtaining, by a controller, from at least one provisioning database of an internet service provider, assigned bandwidth per customer for a plurality of internet service provider customers;
    obtaining, by the controller, from a plurality of peering entry points of the internet service provider, currently used bandwidth per customer for the plurality of internet service provider customers;
    comparing, by the controller, for the plurality of internet service provider customers, the assigned bandwidth per customer to the currently used bandwidth per customer, to determine at least one given customer of the plurality of internet service provider customers putatively suffering from a distributed denial of service attack; and
    the controller initiating at least one remedial action for the at least one given customer of the plurality of internet service provider customers putatively suffering from the distributed denial of service attack.

2. The method of claim 1, further comprising the controller determining, for the plurality of internet service provider customers, a projected bandwidth per customer, wherein the comparing step further comprises comparing the currently used bandwidth per customer to the projected bandwidth per customer.

3. The method of claim 2, wherein the controller determining, for the plurality of internet service provider customers, the projected bandwidth per customer comprises the controller determining the projected bandwidth per customer using machine learning.

4. The method of claim 3, wherein the controller determining, for the plurality of internet service provider customers, the projected bandwidth per customer using the machine learning comprises the controller carrying out inferencing with a trained neural network, the trained neural network being trained on historical data to project the bandwidth per customer based on measured data.

5. The method of claim 4, further comprising training the neural network on the historical data to project the bandwidth per customer.

6. The method of claim 5, further comprising updating the training of the neural network over time for those of the plurality of customers other than the at least one given customer putatively suffering from the distributed denial of service attack.

7. The method of claim 4, wherein the comparing step comprises determining that the at least one given customer putatively suffers from the distributed denial of service attack when the currently used bandwidth per customer for the at least one given customer exceeds the projected bandwidth per customer for the at least one given customer and the currently used bandwidth per customer for the at least one given customer is at least equal to:
    the assigned bandwidth per customer for the at least one given customer; and
    an additional applied amount.

8. The method of claim 7, wherein, in the comparing step, the additional applied amount is determined multiplicatively.

9. The method of claim 7, wherein, in the comparing step, the additional applied amount is determined additively.

10. The method of claim 7, wherein the at least one remedial action initiated by the controller comprises the controller pushing a configuration to the plurality of peering entry points to cause the plurality of peering entry points to block at least one of an IP address and a port associated with the putative distributed denial of service attack.

11. The method of claim 10, further comprising the plurality of peering entry points blocking the at least one of an IP address and a port associated with the putative distributed denial of service attack in accordance with the pushed configuration.

12. The method of claim 10, wherein:
    the controller comprises a core logic module, an IP flows collector coupled to the core logic module, a customer profile collector coupled to the core logic module, a machine learning module coupled to the core logic module, and a configuration push module coupled to the core logic module;
    the controller obtaining the assigned bandwidth per customer for the plurality of internet service provider customers comprises the customer profile collector querying the at least one provisioning database;
    the machine learning module implements the trained neural network;
    the controller obtaining the currently used bandwidth per customer comprises the IP flows collector obtaining the currently used bandwidth per customer from the plurality of peering entry points of the internet service provider;
    the controller comparing, for the plurality of internet service provider customers, the assigned bandwidth per customer to the currently used bandwidth per customer and the currently used bandwidth per customer to the projected bandwidth per customer comprises the core logic module obtaining the assigned bandwidth per customer from the customer profile collector, the core logic module obtaining the currently used bandwidth per customer from the IP flows collector, the core logic module obtaining the projected bandwidth per customer from the machine learning module, and the core logic module comparing the assigned bandwidth per customer to the currently used bandwidth per customer and the currently used bandwidth per customer to the projected bandwidth per customer; and the controller initiating the at least one remedial action comprises the configuration push module pushing the configuration.

13. The method of claim 12, further comprising displaying, on a graphical user interface, data related to the putative distributed denial of service attack.

14. A system comprising:
a memory; and
at least one processor, coupled to the memory, and operative to:
obtain, from at least one provisioning database of an internet service provider, assigned bandwidth per customer for a plurality of internet service provider customers;
obtain, from a plurality of peering entry points of the internet service provider, currently used bandwidth per customer for the plurality of internet service provider customers;
compare, for the plurality of internet service provider customers, the assigned bandwidth per customer to the currently used bandwidth per customer, to determine at least one given customer of the plurality of internet service provider customers putatively suffering from a distributed denial of service attack; and
initiate at least one remedial action for the at least one given customer of the plurality of internet service provider customers putatively suffering from the distributed denial of service attack.

15. The system of claim 14, wherein the at least one processor is further operative to determine, for the plurality of internet service provider customers, a projected bandwidth per customer, wherein the comparing further comprises comparing the currently used bandwidth per customer to the projected bandwidth per customer.

16. The system of claim 15, wherein the at least one processor is operative to determine, for the plurality of internet service provider customers, the projected bandwidth per customer using machine learning.

17. The system of claim 16, wherein the at least one processor implements a trained neural network, and wherein the at least one processor is operative to determine, for the plurality of internet service provider customers, the projected bandwidth per customer, using the machine learning, by carrying out inferencing with the trained neural network, the trained neural network being trained on historical data to project the bandwidth per customer based on measured data.

18. The system of claim 17, wherein the at least one processor is further operative to train the neural network on the historical data to project the bandwidth per customer.

19. The system of claim 18, wherein the at least one processor is further operative to update the training of the neural network over time for those of the plurality of customers other than the at least one given customer putatively suffering from the distributed denial of service attack.

20. The system of claim 17, wherein the at least one processor is operative to determine that the at least one given customer putatively suffers from the distributed denial of service attack when the currently used bandwidth per customer for the at least one given customer exceeds the projected bandwidth per customer for the at least one given customer and the currently used bandwidth per customer for the at least one given customer is at least equal to:
the assigned bandwidth per customer for the at least one given customer; and
an additional applied amount.

21. The system of claim 20, wherein the at least one processor is operative to initiate the at least one remedial action by pushing a configuration to the plurality of peering entry points to cause the plurality of peering entry points to block at least one of an IP address and a port associated with the putative distributed denial of service attack.

22. The system of claim 21, further comprising the plurality of peering entry points, wherein the plurality of peering entry points are configured to blocking the at least one of an IP address and a port associated with the putative distributed denial of service attack in accordance with the pushed configuration.

23. The system of claim 21, wherein:
the at least one processor is operative to instantiate a core logic module, an IP flows collector coupled to the core logic module, a customer profile collector coupled to the core logic module, a machine learning module coupled to the core logic module, and a configuration push module coupled to the core logic module;
a controller comprises the core logic module, the IP flows collector coupled to the core logic module, the customer profile collector coupled to the core logic module, the machine learning module coupled to the core logic module, and the configuration push module coupled to the core logic module;
the controller obtaining the assigned bandwidth per customer for the plurality of internet service provider customers comprises the customer profile collector querying the at least one provisioning database;
the machine learning module implements the trained neural network;
the controller obtaining the currently used bandwidth per customer comprises the IP flows collector obtaining the currently used bandwidth per customer from the plurality of peering entry points of the internet service provider;
the controller comparing, for the plurality of internet service provider customers, the assigned bandwidth per customer to the currently used bandwidth per customer and the currently used bandwidth per customer to the projected bandwidth per customer comprises the core logic module obtaining the assigned bandwidth per customer from the customer profile collector, the core logic module obtaining the currently used bandwidth per customer from the IP flows collector, the core logic module obtaining the projected bandwidth per customer from the machine learning module, and the core logic module comparing the assigned bandwidth per customer to the currently used bandwidth per customer and the currently used bandwidth per customer to the projected bandwidth per customer; and
the controller initiating the at least one remedial action comprises the configuration push module pushing the configuration.

24. The system of claim 23, wherein the at least one processor is further operative to cause display, on a graphical user interface, of data related to the putative distributed denial of service attack.

25. A non-transitory computer readable medium comprising processor executable instructions which when executed by a processor cause a processor to perform the method of:
obtaining, from at least one provisioning database of an internet service provider, assigned bandwidth per customer for a plurality of internet service provider customers;

obtaining, from a plurality of peering entry points of the internet service provider, currently used bandwidth per customer for the plurality of internet service provider customers;

comparing, for the plurality of internet service provider customers, the assigned bandwidth per customer to the currently used bandwidth per customer, to determine at least one given customer of the plurality of internet service provider customers putatively suffering from a distributed denial of service attack; and initiating at least one remedial action for the at least one given customer of the plurality of internet service provider customers putatively suffering from the distributed denial of service attack.

26. A system comprising:

a customer profile collector configured to obtain, from at least one provisioning database of an internet service provider, assigned bandwidth per customer for a plurality of internet service provider customers;

an IP flows collector configured to obtain, from a plurality of peering entry points of the internet service provider, currently used bandwidth per customer for the plurality of internet service provider customers;

a core logic module, coupled to the customer profile collector and the IP flows collector, and configured to compare, for the plurality of internet service provider customers, the assigned bandwidth per customer to the currently used bandwidth per customer, to determine at least one given customer of the plurality of internet service provider customers putatively suffering from a distributed denial of service attack; and a configuration push module, coupled to the core logic module, and configured to initiate at least one remedial action for the at least one given customer of the plurality of internet service provider customers putatively suffering from the distributed denial of service attack.

27. The system of claim 26, further comprising:

a machine learning module, implementing a trained neural network, coupled to the core logic module, and configured to determine, for the plurality of internet service provider customers, a projected bandwidth per customer, by carrying out inferencing with the trained neural network, the trained neural network being trained on historical data to project the bandwidth per customer based on measured data;

wherein the core logic module is further configured to compare the currently used bandwidth per customer to the projected bandwidth per customer to determine the at least one given customer of the plurality of internet service provider customers putatively suffering from the distributed denial of service attack.

28. The system of claim 27, wherein the core logic module is configured to determine the at least one given customer of the plurality of internet service provider customers putatively suffering from the distributed denial of service attack when the currently used bandwidth per customer for the at least one given customer exceeds the projected bandwidth per customer for the at least one given customer and the currently used bandwidth per customer for the at least one given customer is at least equal to:

the assigned bandwidth per customer for the at least one given customer; and an additional applied amount.

29. The system of claim 28, wherein the configuration push module is configured to initiate the at least one remedial action for the at least one given customer of the plurality of internet service provider customers putatively suffering from the distributed denial of service attack by pushing a configuration to the plurality of peering entry points to cause the plurality of peering entry points to block at least one of an IP address and a port associated with the putative distributed denial of service attack.

30. The system of claim 29, further comprising the plurality of peering entry points, wherein the plurality of peering entry points are configured to block the at least one of an IP address and a port associated with the putative distributed denial of service attack in accordance with the pushed configuration.

31. The system of claim 30, further comprising a graphical user interface coupled to the core logic module and configured to display data related to the putative distributed denial of service attack.

* * * * *